(12) United States Patent
Wang et al.

(10) Patent No.: US 11,216,320 B2
(45) Date of Patent: Jan. 4, 2022

(54) METHOD AND APPARATUS FOR COMMUNICATION BETWEEN PROCESSES

(71) Applicant: Alibaba Group Holding Limited, Grand Cayman (KY)

(72) Inventors: Bin Wang, Hangzhou (CN); Liangliang Zhu, Hangzhou (CN); Xu Zeng, Hangzhou (CN); Lingjun Chen, Hangzhou (CN); Zilong Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 116 days.

(21) Appl. No.: 16/714,522

(22) Filed: Dec. 13, 2019

(65) Prior Publication Data

US 2020/0125430 A1    Apr. 23, 2020

Related U.S. Application Data

(63) Continuation of application No. PCT/CN2018/089929, filed on Jun. 5, 2018.

(30) Foreign Application Priority Data

Jun. 14, 2017    (CN) .......................... 201710449251.1

(51) Int. Cl.
*G06F 9/54* (2006.01)
*H04L 12/861* (2013.01)
(Continued)

(52) U.S. Cl.
CPC .............. *G06F 9/546* (2013.01); *H04L 49/90* (2013.01); *H04L 69/22* (2013.01); *H04L 67/12* (2013.01)

(58) Field of Classification Search
CPC ..... G06F 16/2322; H04L 69/22; H04L 69/16; H04L 63/0227; H04L 9/00
See application file for complete search history.

(56) References Cited

U.S. PATENT DOCUMENTS

| 5,222,217 A | 6/1993 | Blount et al. |
| 5,787,300 A | 7/1998 | Wijaya |

(Continued)

FOREIGN PATENT DOCUMENTS

| CN | 1592272 A | 3/2005 |
| CN | 102023961 A | 4/2011 |

(Continued)

OTHER PUBLICATIONS

Translation of CN Search Report dated Dec. 20, 2018, from corresponding CN PCT Application No. PCT/CN2018/089929, 2 pages.

(Continued)

*Primary Examiner* — Iqbal Zaidi
(74) *Attorney, Agent, or Firm* — Lee & Hayes, P.C.

(57) ABSTRACT

Methods and an apparatus for communication between processes are provided. A first process obtains an original message to be sent, where the original message includes a message header and a message body. The first process determines the length of the message header and the length of the message body of the original message to be sent. The first process compresses the length of the message header according to the length of the message header and the length of the message body to obtain a compressed message. The first process adds the compressed message to a message queue pre-created for a second process, where the second process is configured to obtain the compressed message from the message queue.

17 Claims, 21 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 6,829,769 | B2 | 12/2004 | Cranston et al. |
| 7,099,949 | B1 | 8/2006 | Vanhoof et al. |
| 7,389,512 | B2 | 6/2008 | Tucker |
| 8,136,155 | B2 | 3/2012 | Freund |
| 8,286,188 | B1 | 10/2012 | Brief |
| 9,317,702 | B2 | 4/2016 | Andersson et al. |
| 2003/0115358 | A1 | 6/2003 | Yun |
| 2003/0131135 | A1 | 7/2003 | Yun |
| 2006/0056413 | A1 | 3/2006 | Ikeda et al. |
| 2007/0130475 | A1* | 6/2007 | Sathyanath ......... H04L 65/1006 713/189 |
| 2018/0278583 | A1* | 9/2018 | Cela .................... H04L 9/0841 |
| 2020/0104289 | A1* | 4/2020 | Premawardena ....... G01S 17/86 |

FOREIGN PATENT DOCUMENTS

| | | |
|---|---|---|
| CN | 102255972 | 11/2011 |
| CN | 103078921 | 5/2013 |
| CN | 105634684 A | 6/2016 |
| CN | 106470212 | 3/2017 |

OTHER PUBLICATIONS

Translation of CN Written Opinion dated Oct. 4, 2019, from corresponding CN PCT Application No. PCT/CN2018/089929, 4 pages.
Translation of CN 1st Office Action dated Feb. 26, 2021, from corresponding CN Application No. 201710449251.1, 15 pages.
Translation of CN 1st Search Result dated Feb. 4, 2021, from corresponding CN Application No. 201710449251.1, 2 pages.
Translation of CN 2nd Office Action dated Aug. 3, 2021, from corresponding CN Application No. 201710449251.1, 9 pages.

* cited by examiner

200

```
THE FIRST PROCESS OBTAINS AN ORIGINAL MESSAGE TO BE
SENT, WHERE THE ORIGINAL MESSAGE INCLUDES A MESSAGE
HEADER AND A MESSAGE BODY
202
            ↓
THE FIRST PROCESS DETERMINES THE LENGTH OF THE
MESSAGE HEADER AND THE LENGTH OF THE MESSAGE BODY
OF THE ORIGINAL MESSAGE TO BE SENT
204
            ↓
THE FIRST PROCESS COMPRESSES THE LENGTH OF THE
MESSAGE HEADER ACCORDING TO THE LENGTH OF THE
MESSAGE HEADER AND THE LENGTH OF THE MESSAGE BODY
TO OBTAIN THE COMPRESSED MESSAGE
206
            ↓
THE FIRST PROCESS ADDS THE COMPRESSED MESSAGE TO
THE MESSAGE QUEUE PRE-CREATED FOR THE SECOND
PROCESS, AND THE SECOND PROCESS IS CONFIGURED TO
OBTAIN A COMPRESSED MESSAGE FROM THE MESSAGE QUEUE
208
```

```
┌─────────────────────────────────────────────────────┐
│ THE FIRST PROCESS OBTAINS AN ORIGINAL MESSAGE TO    │
│ BE SENT, WHERE THE ORIGINAL MESSAGE INCLUDES A      │
│ MESSAGE HEADER AND A MESSAGE BODY                   │
│ 302                                                 │
└─────────────────────────────────────────────────────┘
                          ↓
┌─────────────────────────────────────────────────────┐
│ THE FIRST PROCESS DETERMINES THE LENGTH OF THE      │
│ MESSAGE HEADER AND THE LENGTH OF THE MESSAGE BODY   │
│ OF THE ORIGINAL MESSAGE TO BE SENT                  │
│ 304                                                 │
└─────────────────────────────────────────────────────┘
                          ↓
┌─────────────────────────────────────────────────────┐
│ THE FIRST PROCESS DETERMINES A TARGET BIT NUMBER,   │
│ WHERE THE TARGET BIT NUMBER IS THE NUMBER OF BITS   │
│ OF A TARGET BIT SEQUENCE INDICATING THE LENGTH OF   │
│ THE MESSAGE BODY, AND THE TARGET BIT SEQUENCE IS    │
│ THE SHORTEST BIT SEQUENCE INDICATING THE LENGTH OF  │
│ THE MESSAGE BODY                                    │
│ 306                                                 │
└─────────────────────────────────────────────────────┘
                          ↓
┌─────────────────────────────────────────────────────┐
│ THE FIRST PROCESS DETERMINES THE TARGET LENGTH      │
│ ACCORDING TO THE TARGET BIT NUMBER                  │
│ 308                                                 │
└─────────────────────────────────────────────────────┘
                          ↓
┌─────────────────────────────────────────────────────┐
│ THE FIRST PROCESS COMPRESSES THE LENGTH OF THE      │
│ MESSAGE HEADER TO THE TARGET LENGTH                 │
│ 310                                                 │
└─────────────────────────────────────────────────────┘
                          ↓
┌─────────────────────────────────────────────────────┐
│ THE FIRST PROCESS ADDS THE COMPRESSED MESSAGE TO    │
│ THE MESSAGE QUEUE PRE-CREATED FOR A SECOND          │
│ PROCESS, WHERE THE SECOND PROCESS IS CONFIGURED TO  │
│ OBTAIN A COMPRESSED MESSAGE FROM THE MESSAGE QUEUE  │
│ 312                                                 │
└─────────────────────────────────────────────────────┘
```

```
┌─────────────────────────────────────────────────────────┐
│  THE SECOND PROCESS DETERMINES THE LENGTH OF THE MESSAGE │
│  HEADER OF THE COMPRESSED MESSAGE, WHERE THE COMPRESSED  │
│    MESSAGE INCLUDES A MESSAGE HEADER AND A MESSAGE BODY  │
│                          402                             │
└─────────────────────────────────────────────────────────┘
                              │
                              ▼
┌─────────────────────────────────────────────────────────┐
│  THE SECOND PROCESS READS, ACCORDING TO THE LENGTH OF THE│
│   MESSAGE HEADER OF THE COMPRESSED MESSAGE, THE MESSAGE  │
│  HEADER OF THE COMPRESSED MESSAGE FROM THE MESSAGE QUEUE │
│  PRE-CREATED BY THE FIRST PROCESS FOR THE SECOND PROCESS │
│                          404                             │
└─────────────────────────────────────────────────────────┘
                              │
                              ▼
┌─────────────────────────────────────────────────────────┐
│  THE SECOND PROCESS DETERMINES THE LENGTH OF THE MESSAGE │
│   BODY ACCORDING TO THE MESSAGE HEADER OF THE COMPRESSED │
│                         MESSAGE                          │
│                          406                             │
└─────────────────────────────────────────────────────────┘
                              │
                              ▼
┌─────────────────────────────────────────────────────────┐
│        THE SECOND PROCESS READS THE CONTENT WITH THE     │
│     CORRESPONDING LENGTH FROM THE MESSAGE QUEUE AS THE   │
│  MESSAGE BODY ACCORDING TO THE LENGTH OF THE MESSAGE BODY│
│                          408                             │
└─────────────────────────────────────────────────────────┘
```

```
┌─────────────────────────────────────────────────────────────┐
│ THE SECOND PROCESS READS THE VALUES OF THE BITS ONE BY ONE FROM THE │
│ MESSAGE QUEUE PRE-CREATED BY THE FIRST PROCESS UNTIL THE VALUES OF THE │
│           READ BITS SATISFY A PRESET CONDITION              │
│                            502                              │
└─────────────────────────────────────────────────────────────┘
                              │
                              ▼
┌─────────────────────────────────────────────────────────────┐
│   WHEN THE VALUES OF THE READ BITS SATISFY THE PRESET CONDITION, THE │
│   SECOND PROCESS DETERMINES THE LENGTH OF THE MESSAGE HEADER OF THE │
│   COMPRESSED MESSAGE ACCORDING TO THE VALUES OF RESPECTIVE READ BITS, │
│    WHERE THE COMPRESSED MESSAGE INCLUDES A MESSAGE HEADER AND A │
│                         MESSAGE BODY                        │
│                            504                              │
└─────────────────────────────────────────────────────────────┘
                              │
                              ▼
┌─────────────────────────────────────────────────────────────┐
│  THE SECOND PROCESS READS THE VALUES OF A FIRST NUMBER OF BITS FROM THE │
│   MESSAGE QUEUE ACCORDING TO THE LENGTH OF THE MESSAGE HEADER OF THE │
│     COMPRESSED MESSAGE. THE FIRST NUMBER IS THE NUMBER OF BITS │
│    CORRESPONDING TO THE LENGTH OF THE MESSAGE HEADER SUBTRACTING THE │
│      NUMBER OF BITS READ WHEN THE PRESET CONDITION IS SATISFIED │
│                            506                              │
└─────────────────────────────────────────────────────────────┘
                              │
                              ▼
┌─────────────────────────────────────────────────────────────┐
│   THE SECOND PROCESS ADDS THE VALUE OF THE FIRST BIT TO THE VALUE OF THE │
│   BIT READ WHEN THE PRESET CONDITION IS SATISFIED AS THE MESSAGE HEADER OF │
│                     THE COMPRESSED MESSAGE                  │
│                            508                              │
└─────────────────────────────────────────────────────────────┘
                              │
                              ▼
┌─────────────────────────────────────────────────────────────┐
│    THE SECOND PROCESS DETERMINES THE LENGTH OF THE MESSAGE BODY │
│     ACCORDING TO THE MESSAGE HEADER OF THE COMPRESSED MESSAGE │
│                            510                              │
└─────────────────────────────────────────────────────────────┘
                              │
                              ▼
┌─────────────────────────────────────────────────────────────┐
│   THE SECOND PROCESS READS THE CONTENT WITH THE CORRESPONDING LENGTH │
│  FROM THE MESSAGE QUEUE AS THE MESSAGE BODY ACCORDING TO THE LENGTH OF │
│                         THE MESSAGE BODY                    │
│                            512                              │
└─────────────────────────────────────────────────────────────┘
```

```
┌─────────────────────────────────────────────────────────────┐
│ THE SENDER OBTAINS AN ORIGINAL MESSAGE TO BE SENT, WHERE THE│
│ ORIGINAL MESSAGE INCLUDES A MESSAGE HEADER AND A MESSAGE BODY│
│                            702                              │
└─────────────────────────────────────────────────────────────┘
                              │
                              ▼
┌─────────────────────────────────────────────────────────────┐
│ THE SENDER DETERMINES THE LENGTH OF THE MESSAGE HEADER AND  │
│ THE LENGTH OF THE MESSAGE BODY OF THE ORIGINAL MESSAGE TO BE│
│                            SENT                             │
│                            704                              │
└─────────────────────────────────────────────────────────────┘
                              │
                              ▼
┌─────────────────────────────────────────────────────────────┐
│   THE SENDER COMPRESSES THE LENGTH OF THE MESSAGE HEADER    │
│  ACCORDING TO THE LENGTH OF THE MESSAGE HEADER AND THE LENGTH│
│    OF THE MESSAGE BODY TO OBTAIN THE COMPRESSED MESSAGE     │
│                            706                              │
└─────────────────────────────────────────────────────────────┘
                              │
                              ▼
┌─────────────────────────────────────────────────────────────┐
│     THE SENDER SENDS THE COMPRESSED MESSAGE TO A RECEIVER   │
│                            708                              │
└─────────────────────────────────────────────────────────────┘
```

```
┌─────────────────────────────────────────────────────────────────┐
│ THE RECEIVER DETERMINES THE LENGTH OF THE MESSAGE HEADER OF THE │
│  COMPRESSED MESSAGE, WHERE THE COMPRESSED MESSAGE INCLUDES A    │
│           MESSAGE HEADER AND A MESSAGE BODY                     │
│                            802                                  │
└─────────────────────────────────────────────────────────────────┘
                                  │
                                  ▼
┌─────────────────────────────────────────────────────────────────┐
│ THE RECEIVER READS, ACCORDING TO THE LENGTH OF THE MESSAGE HEADER│
│  OF THE COMPRESSED MESSAGE, THE MESSAGE HEADER OF THE COMPRESSED │
│ MESSAGE FROM THE MESSAGE QUEUE PRE-CREATED BY THE SENDER FOR THE │
│                           RECEIVER                              │
│                             804                                 │
└─────────────────────────────────────────────────────────────────┘
                                  │
                                  ▼
┌─────────────────────────────────────────────────────────────────┐
│ THE RECEIVER DETERMINES THE LENGTH OF THE MESSAGE BODY ACCORDING │
│      TO THE MESSAGE HEADER OF THE COMPRESSED MESSAGE            │
│                            806                                  │
└─────────────────────────────────────────────────────────────────┘
                                  │
                                  ▼
┌─────────────────────────────────────────────────────────────────┐
│   THE RECEIVER READS THE CONTENT WITH THE CORRESPONDING LENGTH  │
│   FROM THE MESSAGE QUEUE AS THE MESSAGE BODY ACCORDING TO THE   │
│                    LENGTH OF THE MESSAGE BODY                   │
│                             808                                 │
└─────────────────────────────────────────────────────────────────┘
```

```
┌─────────────────────────────────────────────────────────┐
│  THE FIRST PROCESS OBTAINS AN ORIGINAL MESSAGE TO BE SENT, │
│  WHERE THE ORIGINAL MESSAGE INCLUDES A MESSAGE HEADER AND  │
│                    A MESSAGE BODY                          │
│                         902                                │
└─────────────────────────────────────────────────────────┘
                            │
                            ▼
┌─────────────────────────────────────────────────────────┐
│   THE FIRST PROCESS COMPRESSES THE LENGTH OF THE MESSAGE   │
│  HEADER ACCORDING TO THE LENGTH OF THE MESSAGE HEADER AND  │
│   THE LENGTH OF THE MESSAGE BODY TO OBTAIN THE COMPRESSED  │
│                         MESSAGE                            │
│                          904                               │
└─────────────────────────────────────────────────────────┘
                            │
                            ▼
┌─────────────────────────────────────────────────────────┐
│    THE FIRST PROCESS ADDS THE COMPRESSED MESSAGE TO THE    │
│  MESSAGE QUEUE PRE-CREATED FOR THE SECOND PROCESS, WHERE   │
│  THE SECOND PROCESS IS CONFIGURED TO OBTAIN A COMPRESSED   │
│              MESSAGE FROM THE MESSAGE QUEUE                │
│                          906                               │
└─────────────────────────────────────────────────────────┘
```

OBTAIN AN ORIGINAL MESSAGE, WHERE THE ORIGINAL MESSAGE
INCLUDES A MESSAGE HEADER AND A MESSAGE BODY
1002

COMPRESS THE LENGTH OF THE MESSAGE HEADER ACCORDING TO
THE LENGTH OF THE MESSAGE HEADER AND THE LENGTH OF THE
MESSAGE BODY TO OBTAIN THE COMPRESSED MESSAGE
1004

1100

```
┌─────────────────────────────────────────────────────────────┐
│ THE FIRST PROCESS OBTAINS THE LENGTH OF THE MESSAGE CONTENT │
│                         TO BE SENT                          │
│                           1102                              │
└─────────────────────────────────────────────────────────────┘
                              │
                              ▼
┌─────────────────────────────────────────────────────────────┐
│ THE FIRST PROCESS GENERATES A CORRESPONDING MESSAGE HEADER  │
│    ACCORDING TO THE LENGTH OF THE MESSAGE CONTENT           │
│                           1104                              │
└─────────────────────────────────────────────────────────────┘
                              │
                              ▼
┌─────────────────────────────────────────────────────────────┐
│ THE FIRST PROCESS GENERATES A MESSAGE TO BE SENT ACCORDING TO│
│      THE MESSAGE HEADER AND THE MESSAGE CONTENT             │
│                           1106                              │
└─────────────────────────────────────────────────────────────┘
                              │
                              ▼
┌─────────────────────────────────────────────────────────────┐
│ THE FIRST PROCESS ADDS THE MESSAGE TO BE SENT TO THE MESSAGE│
│ QUEUE PRE-CREATED FOR THE SECOND PROCESS, WHERE THE SECOND  │
│ PROCESS IS CONFIGURED TO OBTAIN THE MESSAGE FROM THE MESSAGE│
│                          QUEUE                              │
│                           1108                              │
└─────────────────────────────────────────────────────────────┘
```

FIG. 11

METHOD AND APPARATUS FOR COMMUNICATION BETWEEN PROCESSES

CROSS REFERENCE TO RELATED PATENT APPLICATIONS

The present application claims priority to and is a continuation of PCT Patent Application No. PCT/CN2018/089929 filed on Jun. 5, 2018, and is related to and claims priority to Chinese Patent Application 201710449251.1, filed on Jun. 14, 2017, entitled "Method and Apparatus for Communication between Processes", the entire contents of which are incorporated herein by reference.

TECHNICAL FIELD

The present disclosure relates to the field of computer technology, and in particular, to methods and apparatuses and for communication between processes.

BACKGROUND

In the industrial field, in order to reduce the cost of equipment, there is a large limitation on the hardware resources of the equipment.

For example, in the field of the Internet of Things (IoT), the hardware resources of IoT equipment are very limited. How to meet the overhead of the operating system (OS) under the condition of small hardware resources has become a technical problem to be solved.

In a common operating system, messages can be sent through a message queue between processes. For example, when the A process needs to send a message to the B process, the A process first creates a message queue for communicating with the B process. The A process adds the message that needs to be sent to the message queue, and the B process extracts the message from the message queue to complete the communication.

FIG. 1 is a schematic diagram of a conventional message structure 100. Each of these messages includes a message header 102 and a message body 104. The message header 102 is used to indicate the length of the message content in the message body 104, which is generally 4 bytes in length. The content in the message body 104 is the length declared in the message header 102. When a message needs to be read from the message queue, the message header 102 is first read to obtain the length of the message content, and then the corresponding message content is read according to the length.

In the conventional message structure 100, the message header 102 used to store the length of the message is of a fixed length. In order to be able to indicate a message of 0 to n, an int type is generally used, with the length of 4 bytes. However, many message lengths are relatively short. For example, some message content is only a few tens of bytes in length. Such a length may be indicated with a one-byte message header 102. The rest of the bytes are not needed at all, which results in a waste of bytes of the message header 102.

SUMMARY

This Summary is provided to introduce a selection of implementations in a simplified form that are further described below in the Detailed Description. This Summary is not intended to identify all features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, embodiments of the present disclosure have been proposed in order to provide a method for communication between processes and an apparatus for communication between processes that overcome the above problems or at least partially solve the above problem.

In order to solve the above problem, an example embodiment of the present disclosure discloses a method for communication between processes, including:

obtaining, by a first process, an original message to be sent; the original message including a message header and a message body;

determining, by the first process, the length of the message header and the length of the message body of the original message to be sent;

compressing, by the first process, the length of the message header according to the length of the message header and the length of the message body to obtain a compressed message; and adding, by the first process, the compressed message to a message queue pre-created for a second process, wherein the second process is configured to obtain the compressed message from the message queue.

In an example embodiment, the step of compressing, by the first process, the length of the message header according to the length of the message header and the length of the message body to obtain the compressed message includes:

determining, by the first process, a target bit number, wherein the target bit number is the number of bits of a target bit sequence, and the target bit sequence is the shortest bit sequence indicating the length of the message body;

determining, by the first process, a target length according to the target bit number; and compressing, by the first process, the length of the message header to the target length.

In an example embodiment, the step of compressing, by the first process, the length of the message header to the target length includes:

setting, by the first process, the length of the message header to the target length;

setting, by the first process, a value of a specific bit of the message header according to the target length; and using remaining bits excluding the specific bit of the message header to indicate the length of the message body.

In an example embodiment, the length of the message header is 4, and the step of determining, by the first process, the target length according to the target bit number includes:

if the target bit number is less than or equal to 7, setting the target length to 1;

if the target bit number is greater than 7 and less than or equal to 14, setting the target length to 2;

if the target bit number is greater than 14 and less than or equal to 21, setting the target length to 3; and if the target bit number is greater than 21 and less than or equal to 29, setting the target length to 4.

In an example embodiment, the step of setting, by the first process, the value of the specific bit of the message header according to the target length, and using remaining bits excluding the specific bit of the message header to indicate the length of the message body includes:

if the target length is 1, setting the first bit of the message header to 0, and using the last 7 bits of the message header to indicate the length of the message body;

if the target length is 2, setting the first bit of the first byte of the message header to 1 and setting the second bit of the first byte to 0; and using the values of the last 6 bits of the first byte and all bits of the second byte to indicate the length of the message body;

if the target length is 3, setting the first bit of the first byte of the message header to 1, setting the second bit of the first byte to 1, and setting the third bit of the first byte to 0; and using the values of the last 5 bits of the first byte and all bits of the second byte and the third byte to indicate the length of the message body; and if the target length is 4, setting the first bit of the first byte of the message header to 1, setting the second bit of the first byte to 1, and setting the third bit of the first byte to 1; and using the value of the last 5 bits of the first byte and all bits of the second byte, the third byte, and the fourth byte to indicate the length of the message body.

In an example embodiment, the length is a byte length.

An example embodiment of the present disclosure further discloses a method for communication between processes, comprising:

determining, by a second process, the length of a message header of a compressed message, wherein the compressed message includes a message header and a message body;

reading, by the second process, the message header of the compressed message from a message queue pre-created by a first process for the second process, according to the length of the message header of the compressed message;

determining, by the second process, the length of the message body according to the message header of the compressed message; and reading, by the second process, a content with a corresponding length from the message queue as the message body according to the length of the message body.

In an example embodiment, the step of determining, by the second process, the length of the message header of the compressed message includes:

reading, by the second process, the values of the bits one by one from the message queue until the values of the read bits satisfy a preset condition; and when the values of the read bits satisfy the preset condition, determining, by the second process, the length of the message header of the compressed message according to the values of respective read bits.

In an example embodiment, the step of reading, by the second process, the message header of the compressed message from a message queue pre-created by a first process for the second process according to the length of the message header of the compressed message includes:

reading, by the second process, the values of a first number of bits from the message queue according to the length of the message header of the compressed message, wherein the first number is the number of bits corresponding to the length of the message header subtracting the number of bits read when the preset condition is satisfied; and adding, by the second process, the value of the first bit to the value of the bit read when the preset condition is satisfied as the message header of the compressed message.

In an example embodiment, the step of determining, by the second process, the length of the message body according to the message header of the compressed message includes:

determining, by the second process, the length of the message body according to a value of a specific bit of the message header of the compressed message.

In an example embodiment, the step of determining, by the second process, the length of the message header of the compressed message according to the values of respective read bits when the values of the read bits satisfy the preset condition includes:

if the value of the first bit is 0, determining, by the second process, the length of the message header as 1;

if the value of the first bit is 1 and the value of the second bit is 0, determining, by the second process, the length of the message header as 2;

if the value of the first bit is 1, the value of the second bit is 1, and the value of the third bit is 0, determining, by the second process, the length of the message header as 3; and if the value of the first bit is 1, the value of the second bit is 1, and the value of the third bit is 1, determining, by the second process, the length of the message header as 4.

In an example embodiment, the step of determining, by the second process, the length of the message body according to the value of the specific bit of the message header of the compressed message includes:

if the length of the message header is 1, determining, by the second process, the length of the message body using the values of the last 7 bits of the message header;

if the length of the message header is 2, determining, by the second process, the length of the message body using the values of the last 6 bits of the first byte of the message header and the values of all bits of the second byte;

if the length of the message header is 3, determining, by the second process, the length of the message body using the values of the last 5 bits of the first byte of the message header and the values of all bits of the second byte and the third byte of the message header; and if the length of the message header is 4, determining, by the second process, the length of the message body using the values of the last 5 bits of the first byte of the message header and the values of all bits of the second byte, the third byte, and the fourth byte of the message header.

In an example embodiment, the length is a byte length.

An example embodiment of the present disclosure further discloses a method for communication, comprising:

obtaining, by a sender, an original message to be sent, wherein the original message includes a message header and a message body;

determining, by the sender, the length of the message header and the length of the message body of the original message to be sent;

compressing, by the sender, the length of the message header according to the length of the message header and the length of the message body to obtain a compressed message; and sending, by the sender, the compressed message to a receiver.

In an example embodiment, the step of compressing, by the sender, the length of the message header according to the length of the message header and the length of the message body to obtain a compressed message includes:

determining, by the sender, a target bit number, wherein the target bit number is the number of bits of a target bit sequence, and the target bit sequence is the shortest bit sequence indicating the length of the message body;

determining, by the sender, a target length according to the target bit number; and compressing, by the sender, the length of the message header to the target length.

In an example embodiment, the step of compressing, by the sender, the length of the message header to the target length includes:

setting, by the sender, the length of the message header to the target length;

setting, by the sender, a value of a specific bit of the message header according to the target length, and using remaining bits excluding the specific bit of the message header to indicate the length of the message body.

In an example embodiment, the length of the message header is 4, and the step of determining, by the sender, the target length according to the target bit number includes:

if the target bit number is less than or equal to 7, setting the target length to 1;

if the target bit number is greater than 7 and less than or equal to 14, setting the target length to 2;

if the target bit number is greater than 14 and less than or equal to 21, setting the target length to 3; and if the target bit number is greater than 21 and less than or equal to 29, setting the target length to 4.

In an example embodiment, the step of setting, by the sender, the value of the specific bit of the message header according to the target length, and using remaining bits excluding the specific bit of the message header to indicate the length of the message body includes:

if the target length is 1, setting the first bit of the message header to 0, and using the last 7 bits of the message header to indicate the length of the message body;

if the target length is 2, setting the first bit of the first byte of the message header to 1 and setting the second bit of the first byte to 0; and using the value of the last 6 bits of the first byte and all bits of the second byte to indicate the length of the message body;

if the target length is 3, setting the first bit of the first byte of the message header to 1, setting the second bit of the first byte to 1, and setting the third bit of the first byte to 0; and using the value of the last 5 bits of the first byte and all bits of the second byte and the third byte to indicate the length of the message body; and if the target length is 4, setting the first bit of the first byte of the message header to 1, setting the second bit of the first byte to 1, and setting the third bit of the first byte to 1; and using the value of the last 5 bits of the first byte and all bits of the second byte, the third byte, and the fourth byte to indicate the length of the message body.

In an example embodiment, the length is a byte length.

An example embodiment of the present disclosure further discloses a method for communication, comprising:

determining, by a receiver, the length of a message header of a compressed message, wherein the compressed message includes a message header and a message body;

reading, by the receiver, the message header of the compressed message from a message queue pre-created by a sender for the receiver, according to the length of the message header of the compressed message;

determining, by the receiver, the length of the message body according to the message header of the compressed message; and reading, by the receiver, a content with a corresponding length from the message queue as the message body according to the length of the message body.

In an example embodiment, the step of determining, by the receiver, the length of the message header of the compressed message includes:

reading, by the receiver, the values of the bits one by one from the message queue until the values of the read bits satisfy a preset condition; and when the values of the read bits satisfy the preset condition, determining, by the receiver, the length of the message header of the compressed message according to the values of respective read bits.

In an example embodiment, the step of reading, by the receiver, the message header of the compressed message from a message queue pre-created by the sender for the receiver according to the length of the message header of the compressed message includes:

reading, by the receiver, the values of a first number of bits from the message queue according to the length of the message header of the compressed message, wherein the first number is the number of bits corresponding to the length of the message header subtracting the number of bits read when the preset condition is satisfied;

adding, by the receiver, the values of a first number of bits to the value of the bit read when the preset condition is satisfied as the message header of the compressed message.

In an example embodiment, the step of determining, by the receiver, the length of the message body according to the message header of the compressed message includes:

determining, by the receiver, the length of the message body according to the value of the specific bit of the message header of the compressed message.

In an example embodiment, the step of determining, by the receiver, the length of the message header of the compressed message according to the values of respective read bits when the values of the read bits satisfy the preset condition includes:

if the value of the first bit is 0, determining, by the receiver, the length of the message header as 1;

if the value of the first bit is 1 and the value of the second bit is 0, determining, by the receiver, the length of the message header as 2;

if the value of the first bit is 1, the value of the second bit is 1, and the value of the third bit is 0, determining, by the receiver, the length of the message header as 3;

and if the value of the first bit is 1, the value of the second bit is 1, and the value of the third bit is 1, determining, by the receiver, the length of the message header as 4.

In an example embodiment, the step of determining, by the receiver, the length of the message body according to the value of the specific bit of the message header of the compressed message includes:

if the length of the message header is 1, determining, by the receiver, the length of the message body using the values of the last 7 bits of the message header;

if the length of the message header is 2, determining, by the receiver, the length of the message body using the values of the last 6 bits of the first byte of the message header and the values of all bits of the second byte;

if the length of the message header is 3, determining, by the receiver, the length of the message body using the values of the last 5 bits of the first byte of the message header and the values of all bits of the second byte and the third byte of the message header; and if the length of the message header is 4, determining, by the receiver, the length of the message body using the values of the last 5 bits of the first byte of the message header and the values of all bits of the second byte, the third byte, and the fourth byte of the message header.

In an example embodiment, the length is a byte length.

An example embodiment of the present disclosure further discloses a method of communication between processes, comprising:

obtaining, by a first process, an original message to be sent; the original message including a message header and a message body;

compressing, by the first process, the length of the message header according to the length of the message header and the length of the message body to obtain a compressed message; and adding, by the first process, the compressed message to a message queue pre-created for a second process, wherein the second process is configured to obtain the compressed message from the message queue.

In an example embodiment, the step of compressing, by the first process, the length of the message header according to the length of the message header and the length of the message body to obtain the compressed message includes:

determining, by the first process, a target bit number, wherein the target bit number is the number of bits of a target bit sequence, and the target bit sequence is the shortest bit sequence indicating the length of the message body;

determining, by the first process, a target length according to the target bit number; and compressing, by the first process, the length of the message header to the target length.

In an example embodiment, the step of compressing, by the first process, the length of the message header to the target length includes:

setting, by the first process, the length of the message header to the target length;

setting, by the first process, a value of a specific bit of the message header according to the target length; and using remaining bits excluding the specific bit of the message header to indicate the length of the message body.

In an example embodiment, the length is a byte length.

An example embodiment of the present disclosure further discloses a method for message compression, comprising:

obtaining an original message, wherein the original message includes a message header and a message body; and compressing the length of the message header according to the length of the message header and the length of the message body to obtain a compressed message.

In an example embodiment, the step of compressing the length of the message header according to the length of the message header and the length of the message body to obtain a compressed message includes:

determining a target bit number, wherein the target bit number is the number of bits of a target bit sequence, and the target bit sequence is the shortest bit sequence indicating the length of the message body;

determining a target length according to the target bit number; and compressing the length of the message header to the target length.

In an example embodiment, the step of compressing the length of the message header to the target length includes:

setting the length of the message header to the target length; and setting a value of a specific bit of the message header according to the target length, and using remaining bits excluding the specific bit of the message header to indicate the length of the message body.

In an example embodiment, the length is a byte length.

An example embodiment of the present disclosure further discloses a method of communication between processes, comprising:

obtaining, by a first process, the length of a message content to be sent;

generating, by a first process, a corresponding message header according to the length of the message content;

generating, by a first process, a message to be sent according to the message header and the message content; and adding, by a first process, the message to be sent to a message queue pre-created for a second process, wherein the second process is configured to obtain the message from the message queue.

In an example embodiment, the step of generating, by a first process, a corresponding message header according to the length of the message content includes:

determining, by the first process, the length of the message header according to the length of the message content;

generating, by a first process, a message header according to the length of the message header; and setting, by the first process, a value of a specific bit of the message header according to the length of the message header, and using remaining bits excluding the specific bit of the message header to indicate the length of the message content.

In an example embodiment, the step of determining, by the first process, the length of the message header according to the length of the message content includes:

determining, by the first process, a target bit number according to the length of the message content, wherein the target bit number is the number of bits of a target bit sequence, and the target bit sequence is the shortest bit sequence indicating the length of the message content; and determining, by the first process, a target length according to the target bit number.

In an example embodiment, the length is a byte length.

An example embodiment of the present disclosure further discloses a method for generating a message, comprising:

obtaining the length of a message content;

generating a corresponding message header according to the length of the message content; and generating a message based on the message header and the message content.

In an example embodiment, the step of generating the corresponding message header according to the length of the message content includes:

determining the length of the message header according to the length of the message content;

generating a message header according to the length of the message header; and setting a value of a specific bit of the message header according to the length of the message header, and using remaining bits excluding the specific bit of the message header to indicate the length of the message content.

In an example embodiment, the step of determining the length of the message header according to the length of the message content includes:

determining a target bit number according to the length of the message content, wherein the target bit number is the number of bits of a target bit sequence, and the target bit sequence is the shortest bit sequence indicating the length of the message content; and determining a target length according to the target bit number.

In an example embodiment, the length is a byte length.

An example embodiment of the present disclosure further discloses an apparatus for communication between processes, comprising: a first process module and a second process module, wherein the first process module includes:

an original message obtaining sub-module, configured to obtain an original message to be sent, wherein the original message including a message header and a message body;

a length determining sub-module, configured to determine the length of the message header and the length of the message body of the original message to be sent;

a message compression sub-module, configured to compress the length of the message header according to the length of the message header and the length of the message body to obtain a compressed message; and a compressed message adding sub-module, configured to add the compressed message to the message queue pre-created for the second process module, wherein the second process module includes:

a compressed message obtaining sub-module, configured to obtain the compressed message from the message queue.

In an example embodiment, the message compression sub-module includes:

a target bit number determining unit, configured to determine a target bit number, wherein the target bit number is the number of bits of a target bit sequence, and the target bit sequence is the shortest bit sequence indicating the length of the message body;

a target length determining unit, configured to determine a target length according to the target bit number; and a message compression unit, configured to compress the length of the message header to the target length.

In an example embodiment, the message compression unit includes:

a length setting subunit, configured to set the length of the message header to the target length; and a bit setting subunit, configured to set a value of a specific bit of the message header according to the target length; and using remaining bits excluding the specific bit of the message header to indicate the length of the message body.

In an example embodiment, the length of the message header is 4, and the target length determining unit includes:

a first target length determining subunit, configured to set a target length to 1 if the target bit number is less than or equal to 7;

a second target length determining subunit, configured to set the target length to 2 if the target bit number is greater than 7 and less than or equal to 14;

a third target length determining subunit, configured to set the target length to 3 if the target bit number is greater than 14 and less than or equal to 21; and a fourth target length determining subunit, configured to set the target length to 4 if the target bit number is greater than 21 and less than or equal to 29.

In an example embodiment, the bit setting subunit includes:

a first bit setting component, configured to: if the target length is 1, set the first bit of the message header to 0, and use the last 7 bits of the message header to indicate the length of the message body;

a second bit setting component, configured to: if the target length is 2, set the first bit of the first byte of the message header to 1 and set the second bit of the first byte to 0, and use the values of the last 6 bits of the first byte and all bits of the second byte to indicate the length of the message body;

a third bit setting component, configured to: if the target length is 3, set the first bit of the first byte of the message header to 1, set the second bit of the first byte to 1, and set the third bit of the first byte to 0, and use the values of the last 5 bits of the first byte and all bits of the second byte and the third byte to indicate the length of the message body; and a fourth bit setting component, configured to: if the target length is 4, set the first bit of the first byte of the message header to 1, set the second bit of the first byte to 1, and set the third bit of the first byte to 1, and uses the values of the last 5 bits of the first byte and all bits of the second byte, the third byte, and the fourth byte to indicate the length of the message body.

In an example embodiment, the length is a byte length.

An example embodiment of the present disclosure further discloses an apparatus for communication between processes, comprising: a first process module and a second process module, wherein the second process module includes:

a message header length determining sub-module, configured to determine the length of a message header of a compressed message, wherein the compressed message includes a message header and a message body;

a message header reading sub-module, configured to read, according to the length of the message header of the compressed message, the message header of the compressed message from the message queue pre-created by the first process module for the second process module;

a message body length determining sub-module, configured to determine the length of the message body according to the message header of the compressed message; and a message body reading sub-module, configured to read a content with a corresponding length from the message queue as the message body according to the length of the message body.

In an example embodiment, the message header length determining sub-module includes:

a first bit reading unit, configured to read the values of the bits one by one from the message queue until the values of the read bits satisfy a preset condition; and a message header length determining unit, configured to determine the length of the message header of the compressed message according to the values of respective read bits when the values of the read bits satisfy the preset condition.

In an example embodiment, the message header reading sub-module includes:

a second bit reading unit, configured to read the values of a first number of bits from the message queue according to the length of the message header of the compressed message; wherein the first number is the number of bits corresponding to the length of the message header subtracting the number of bits read when the preset condition is satisfied; and a message header determining unit, configured to add the value of the first bit to the value of the bit read when the preset condition is satisfied as the message header of the compressed message.

In an example embodiment, the message body length determining sub-module includes:

a message body length determining unit, configured to determine the length of the message body according to a value of a specific bit of the message header of the compressed message.

In an example embodiment, the message header length determining unit comprises:

a first message header length determining subunit, configured to determine the length of the message header as 1 if the value of the first bit is 0;

a second message header length determining subunit, configured to determine the length of the message header as 2 if the value of the first bit is 1 and the value of the second bit is 0;

a third message header length determining subunit, configured to determine the length of the message header as 3 if the value of the first bit is 1, the value of the second bit is 1, and the value of the third bit is 0; and a fourth message header length determining subunit, configured to determine the length of the message header as 4 if the value of the first bit is 1, the value of the second bit is 1, and the value of the third bit is 1.

In an example embodiment, the message body length determining unit includes:

a first message body length determining subunit, configured to: if the length of the message header is 1, determine the length of the message body using the values of the last 7 bits of the message header;

a second message body length determining subunit, configured to: if the length of the message header is 2, determine the length of the message body using the values of the last 6 bits of the first byte of the message header and the values of all bits of the second byte;

a third message body length determining subunit, configured to: if the length of the message header is 3, determine the length of the message body using the values of the last 5 bits of the first byte of the message header and the values of all bits of the second byte and the third byte of the message header; and a fourth message body length determining subunit, configured to: if the length of the message header is 4, determine the length of the message body using the values of the last 5 bits of the first byte of the message header and the values of all bits of the second byte, the third byte, and the fourth byte of the message header.

In an example embodiment, the length is a byte length.

An example embodiment of the present disclosure further discloses an apparatus for communication, comprising: a sender module and a receiver module, wherein the sender module includes:

an original message obtaining sub-module, configured to obtain an original message to be sent, wherein the original message includes a message header and a message body;

a length determining sub-module, configured to determine the length of the message header and the length of the message body of the original message to be sent;

a message compression sub-module, configured to compress the length of the message header according to the length of the message header and the length of the message body to obtain a compressed message; and a compressed message sending sub-module, configured to send the compressed message to a receiver.

In an example embodiment, the message compression sub-module includes:

a target bit number determining unit, configured to determine a target bit number, wherein the target bit number is the number of bits of a target bit sequence, and the target bit sequence is the shortest bit sequence indicating the length of the message body;

a target length determining unit, configured to determine a target length according to the target bit number; and a message compression unit, configured to compress the length of the message header to the target length.

In an example embodiment, the message compression unit includes:

a length setting subunit, configured to set the length of the message header to the target length;

a bit setting subunit, configured to set a value of a specific bit of the message header according to the target length; and use remaining bits excluding the specific bit of the message header to indicate the length of the message body.

In an example embodiment, the length of the message header is 4, and the target length determining unit includes:

a first target length determining subunit, configured to set a target length to 1 if the target bit number is less than or equal to 7;

a second target length determining subunit, configured to set the target length to 2 if the target bit number is greater than 7 and less than or equal to 14;

a third target length determining subunit, configured to set the target length to 3 if the target bit number is greater than 14 and less than or equal to 21; and a fourth target length determining subunit, configured to set the target length to 4 if the target bit number is greater than 21 and less than or equal to 29.

In an example embodiment, the bit setting subunit includes:

a first bit setting component, configured to: if the target length is 1, set the first bit of the message header to 0, and use the last 7 bits of the message header to indicate the length of the message body;

a second bit setting component, configured to: if the target length is 2, set the first bit of the first byte of the message header to 1 and set the second bit of the first byte to 0, and use the values of the last 6 bits of the first byte and all bits of the second byte to indicate the length of the message body;

a third bit setting component, configured to: if the target length is 3, set the first bit of the first byte of the message header to 1, set the second bit of the first byte to 1, and set the third bit of the first byte to 0, and use the values of the last 5 bits of the first byte and all bits of the second byte and the third byte to indicate the length of the message body; and a fourth bit setting component, configured to: if the target length is 4, set the first bit of the first byte of the message header to 1, set the second bit of the first byte to 1, and set the third bit of the first byte to 1, and uses the values of the last 5 bits of the first byte and all bits of the second byte, the third byte, and the fourth byte to indicate the length of the message body.

In an example embodiment, the length is a byte length.

An example embodiment of the present disclosure further discloses an apparatus for communication, comprising: a sender module and a receiver module, wherein the receiver module includes:

a message header length determining sub-module, configured to determine the length of a message header of a compressed message, wherein the compressed message includes a message header and a message body;

a message header reading sub-module, configured to read, according to the length of the message header of the compressed message, the message header of the compressed message from the message queue pre-created by the first process module for the second process module;

a message body length determining sub-module, configured to determine the length of the message body according to the message header of the compressed message; and a message body reading sub-module, configured to read a content with a corresponding length from the message queue as the message body according to the length of the message body.

In an example embodiment, the message header length determining sub-module includes:

a first bit reading unit, configured to read the values of the bits one by one from the message queue until the values of the read bits satisfy a preset condition; and a message header length determining unit, configured to determine the length of the message header of the compressed message according to the values of respective read bits when the values of the read bits satisfy the preset condition.

In an example embodiment, the message header reading sub-module includes:

a second bit reading unit, configured to read the values of a first number of bits from the message queue according to the length of the message header of the compressed message; wherein the first number is the number of bits corresponding to the length of the message header subtracting the number of bits read when the preset condition is satisfied; and a message header determining unit, configured to add the value of the first bit to the value of the bit read when the preset condition is satisfied as the message header of the compressed message.

In an example embodiment, the message body length determining sub-module includes:

a message body length determining unit, configured to determine the length of the message body according to a value of a specific bit of the message header of the compressed message.

In an example embodiment, the message header length determining unit includes:

a first message header length determining subunit, configured to determine the length of the message header as 1 if the value of the first bit is 0;

a second message header length determining subunit, configured to determine the length of the message header as 2 if the value of the first bit is 1 and the value of the second bit is 0;

a third message header length determining subunit, configured to determine the length of the message header as 3 if the value of the first bit is 1, the value of the second bit is 1, and the value of the third bit is 0; and a fourth message header length determining subunit, configured to determine the length of the message header as 4 if the value of the first bit is 1, the value of the second bit is 1, and the value of the third bit is 1.

In an example embodiment, the message body length determining unit includes:

a first message body length determining subunit, configured to: if the length of the message header is 1, determine the length of the message body using the values of the last 7 bits of the message header;

a second message body length determining subunit, configured to: if the length of the message header is 2, determine the length of the message body using the values of the last 6 bits of the first byte of the message header and the values of all bits of the second byte;

a third message body length determining subunit, configured to: if the length of the message header is 3, determine the length of the message body using the values of the last 5 bits of the first byte of the message header and the values of all bits of the second byte and the third byte of the message header; and a fourth message body length determining subunit, configured to: if the length of the message header is 4, determine the length of the message body using the values of the last 5 bits of the first byte of the message header and the values of all bits of the second byte, the third byte, and the fourth byte of the message header.

In an example embodiment, the length is a byte length.

An example embodiment of the present disclosure further discloses an apparatus for communication between processes, comprising: a first process module and a second process module, wherein the first process module includes:

an original message obtaining sub-module, configured to obtain an original message to be sent, wherein the original message including a message header and a message body;

a message compression sub-module, configured to compress the length of the message header according to the length of the message header and the length of the message body to obtain a compressed message; and a compressed message adding sub-module, configured to add the compressed message to the message queue pre-created for the second process, wherein the second process module includes:

a compressed message obtaining sub-module, configured to obtain the compressed message from the message queue.

In an example embodiment, the message compression sub-module includes:

a target bit number determining unit, configured to determine a target bit number, wherein the target bit number is the number of bits of a target bit sequence, and the target bit sequence is the shortest bit sequence indicating the length of the message body;

a target length determining unit, configured to determine a target length according to the target bit number; and a message compression unit, configured to compress the length of the message header to the target length.

In an example embodiment, the message compression unit includes:

a length setting subunit, configured to set the length of the message header to the target length; and a bit setting subunit, configured to set a value of a specific bit of the message header according to the target length; and using remaining bits excluding the specific bit of the message header to indicate the length of the message body.

In an example embodiment, the length is a byte length.

An example embodiment of the present disclosure further discloses an apparatus for message compression, comprising:

an original message obtaining module, configured to obtain an original message, wherein the original message includes a message header and a message body; and a message compression module, configured to compress the length of the message header according to the length of the message header and the length of the message body to obtain a compressed message.

In an example embodiment, the message compression module includes:

a target bit number determining sub-module, configured to determine a target bit number, wherein the target bit number is the number of bits of a target bit sequence, and the target bit sequence is the shortest bit sequence indicating the length of the message body;

a target length determining sub-module, configured to determine a target length according to the target bit number; and a message compression sub-module, configured to compress the length of the message header to the target length.

In an example embodiment, the message compression sub-module includes:

a length setting unit, configured to set the length of the message header to the target length; and a bit setting unit, configured to set a value of a specific bit of the message header according to the target length; and use remaining bits excluding the specific bit of the message header to indicate the length of the message body.

In an example embodiment, the length is a byte length.

An example embodiment of the present disclosure further discloses an apparatus for communication between processes, comprising: a first process module and a second process module;

wherein the first process module includes:

a content length obtaining sub-module, configured to obtain the length of a message content to be sent;

a message header generating sub-module, configured to generate a corresponding message header according to the length of the message content;

a message generating sub-module, configured to generate a message to be sent according to the message header and the message content; and a message adding sub-module, configured to add the message to be sent to the message queue pre-created for the second process, wherein the second process module includes:

a message obtaining sub-module, configured to obtain the message from the message queue.

In an example embodiment, message header generating sub-module includes:

a message header length determining unit, configured to determine the length of the message header according to the length of the message content;

a message header generating unit, configured to generate a message header according to the length of the message header; and a bit setting unit, configured to set a value of a specific bit of the message header according to the length of the message header; and use remaining bits excluding the specific bit of the message header to indicate the length of the message content.

In an example embodiment, the message header length determining unit includes:

a bit number determining subunit, configured to determine a target bit number according to the length of the message content, wherein the target bit number is the number of bits of a target bit sequence, and the target bit sequence is the shortest bit sequence indicating the length of the message content; and a target length determining subunit, configured to determine a target length according to the target bit number.

In an example embodiment, the length is a byte length.

An example embodiment of the present disclosure further discloses an apparatus for generating message, comprising:

a message content length obtaining module, configured to obtain the length of a message content;

a message header generating module, configured to generate a corresponding message header according to the length of the message content; and a message generating module, configured to generate a message according to the message header and the message content.

In an example embodiment, the message header generating module includes:

a message header length determining sub-module, configured to determine the length of the message header according to the length of the message content;

a message header generating sub-module, configured to generate a message header according to the length of the message header; and a bit setting sub-module, configured to set a value of a specific bit of the message header according to the length of the message header; and use remaining bits excluding the specific bit of the message header to indicate the length of the message content.

In an example embodiment, the message header length determining sub-module includes:

a target bit number determining unit, configured to determine a target bit number according to the length of the message content, wherein the target bit number is the number of bits of a target bit sequence, and the target bit sequence is the shortest bit sequence indicating the length of the message content; and a target length determining unit, configured to determine the target length according to the target bit number.

In an example embodiment, the length is a byte length.

An example embodiment of the present disclosure further discloses an apparatus, comprising:

one or more processors; and one or more machine-readable medium having instructions stored thereon, when executed by the one or more processors, the instructions cause the apparatus to perform one or more methods as stated above.

An example embodiment of the present disclosure further discloses one or more machine-readable medium having instructions stored thereon, when executed by one or more processors, the instructions cause the apparatus to perform one or more methods as stated above.

Embodiments of the present disclosure include the following advantages:

In an example embodiment of the present disclosure, during the process of sending and receiving the message through the message queue between any two processes, the sender process compresses the message header according to the length of the message body and the length of the message header of the original message to be sent, deletes the bytes in the message header that do not need to indicate the length of the message body, and reduces the length of the compressed message header. Therefore, the length of the message stored in the message queue is reduced, and the occupation of the memory resource is reduced. The present disclosure is applicable to an operating system with limited hardware resources or other operation systems with relatively tight resources in the IoT field.

BRIEF DESCRIPTION OF THE DRAWINGS

In order to illustrate the example embodiments of the present disclosure more clearly, the drawings used in the description will be briefly introduced below. Apparently, the drawings in the following description represent some of the example embodiments of the present disclosure, and other drawings may be obtained from these drawings by those skilled in the art without any creative efforts.

FIG. 2 is a flow chart showing the steps of Embodiment 1 of a method for communication between processes in the present disclosure;

FIG. 3 is a flow chart showing the steps of Embodiment 2 of a method for communication between processes in the present disclosure;

FIG. 4 is a flow chart showing the steps of Embodiment 3 of a method for communication between processes in the present disclosure;

FIG. 5 is a flow chart showing the steps of Embodiment 4 of a method for communication between processes in the present disclosure;

FIG. 7 is a flow chart showing the steps of Embodiment 1 of a method for communication of the present disclosure;

FIG. 8 is a flow chart showing the steps of Embodiment 2 of a method for communication of the present disclosure;

FIG. 9 is a flow chart showing the steps of Embodiment 5 of a method for communication between processes in the present disclosure;

FIG. 11 is a flow chart showing the steps of Embodiment 6 of a method for communication between processes in the present disclosure;

DETAILED DESCRIPTION

Figure 1:
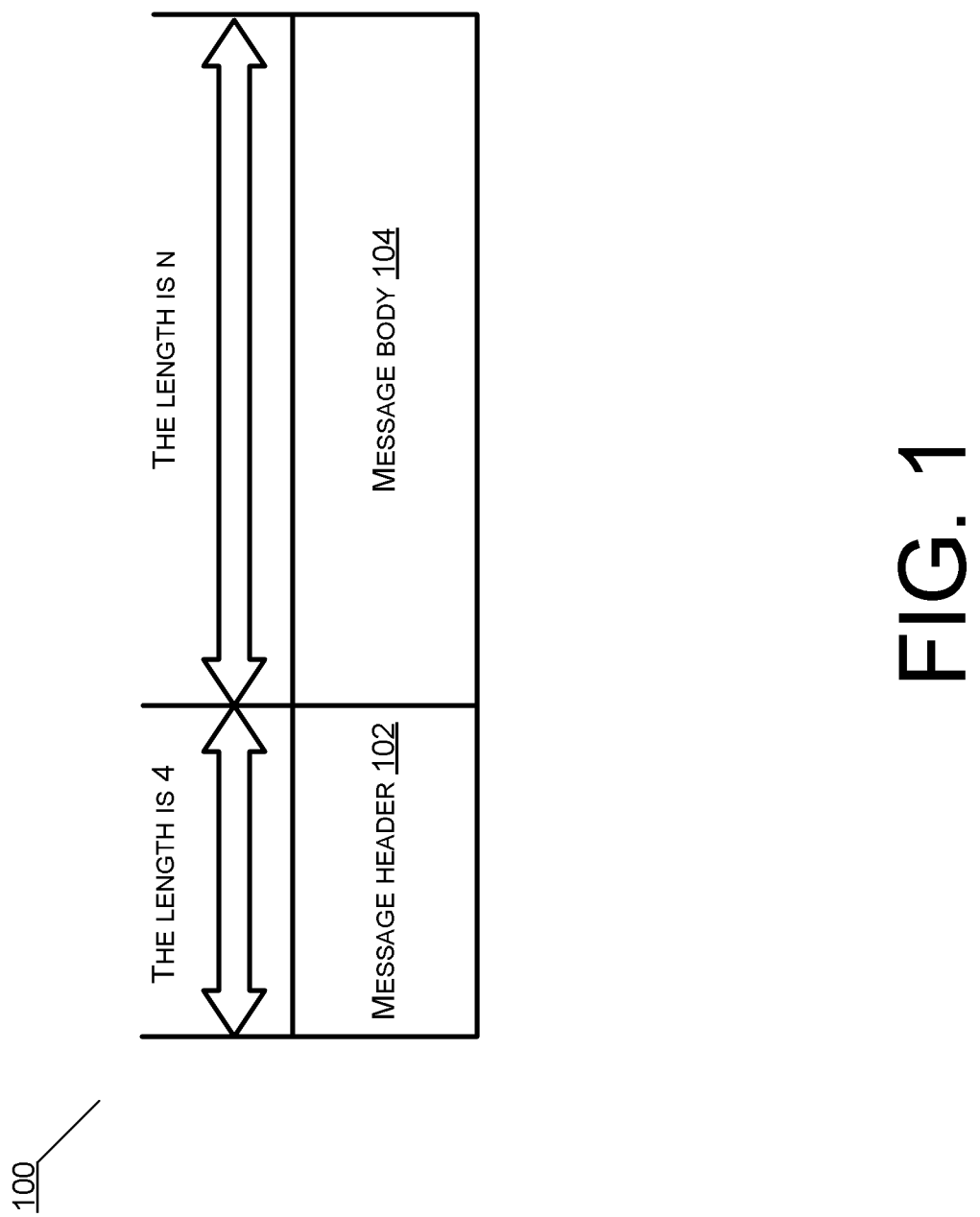
FIG. 1 is a schematic diagram of a conventional message structure.

In order to make the above-described objects, features, and advantages of the present disclosure more apparent and understandable, further detailed descriptions are provided hereinafter with reference to drawings and embodiments.

The example embodiments of the present disclosure may include that, during the process of sending and receiving the message through the message queue of any two processes, the sender process performs compression process on the message header according to the length of the message body and the length of the message header of the message to be sent, and deletes the bytes in the message header that are not needed to indicate the length of the message body, reducing the length of the compressed message header.

Referring to FIG. 2, a flow chart of the steps of Embodiment 1 of a method 200 for communication between processes of the present disclosure is shown, which may include the following:

At block 202, the first process obtains an original message to be sent, where the original message includes a message header and a message body.

In an example embodiment of the present disclosure, the message includes two parts, a message header of a former part and a message body of a latter part.

The message header may include one or more bytes. One byte includes 8 bits. The values of respective bits of respective bytes of the message header may indicate the length of the message body.

For example, a 4-byte message header may have a value of 0000 0000 0000 0000 0000 0000 0000 0111, and its corresponding decimal number is 7, indicating that the length of the message body is 7 bytes.

In an example embodiment of the present disclosure, for the original message to be sent, the length of the message header is greater than the length required to indicate the length of the corresponding message body.

For example, a message body of 7 bytes in length can actually be indicated by only 1 byte 0000 0111. However, the message header uses 4 bytes, of which 3 bytes are actually wasted.

For a device with a small memory resource, transmitting meaningless bytes is equivalent to increasing the amount of data to be sent by the process, wasting memory resource usage.

At block 204, the first process determines the length of the message header and the length of the message body of the original message to be sent.

In an example embodiment of the present disclosure, the length is a byte length.

The length of the message header of the original message is the length before the message header is compressed, and a sequence of values of respective bits of respective bytes in the message header may indicate the length of the message body.

At block 206, the first process compresses the length of the message header according to the length of the message header and the length of the message body to obtain the compressed message.

The first process can determine the minimum number of bytes required to indicate the length based on the length of the message body. The first process then compresses the length of the message header based on the required minimum number of bytes.

For example, if the length of the message body is 31 bytes, the corresponding binary number is 0001 1111. Only 1 byte is required to indicate this length. If the original length of the message header is 4 bytes, the message header is compressed to 1 byte, thereby obtaining a compressed message.

At block 208, the first process adds the compressed message to the message queue pre-created for the second process, and the second process is configured to obtain a compressed message from the message queue.

The first process needs to establish the message queue in advance before sending the message to the second process. After the message queue is created, the compressed message is added to the message queue. The second process reads the compressed message from the message queue, thereby completing the process of sending and receiving messages.

In an example embodiment of the present disclosure, during the process of sending and receiving the message through the message queue of any two processes, the sender process performs compression process on the message header according to the length of the message body and the length of the message header of the original message to be sent, and deletes the bytes in the message header that are not needed to indicate the length of the message body, reducing the length of the compressed message header. Therefore, the length of the message stored in the message queue is reduced, and the occupation of the memory resource is reduced. The present disclosure is applicable to an operating system with limited hardware resources or other operation systems with relatively tight resources in the IoT field.

Referring to FIG. 3, a flow chart of the steps of Embodiment 2 of the method 300 for communication between processes of the present disclosure is shown, which may include the following:

At block 302, the first process obtains an original message to be sent, where the original message includes a message header and a message body.

In an example embodiment of the present disclosure, the message includes two parts, a message header of a former part and a message body of a latter part.

At block 304, the first process determines the length of the message header and the length of the message body of the original message to be sent.

In an example embodiment of the present disclosure, the length is a byte length. The length of the message header of the original message is the length before the message header is compressed, and a sequence of values of respective bits of respective bytes of the message header may indicate the length of the message body.

At block 306, the first process determines a target bit number, where the target bit number is the number of bits of a target bit sequence indicating the length of the message body, and the target bit sequence is the shortest bit sequence indicating the length of the message body.

The target bit sequence is the shortest bit sequence indicating the length of the message body. For example, if the length of the message body is 127 bytes, the corresponding shortest bit sequence is 1111111, and the bit number of the bit sequence is 7 bits.

At block 308, the first process determines the target length according to the target bit number.

The bit number corresponding to the target length is greater than the target bit number.

The determination of the target length may be divided stepwise according to the size of the target bit number.

In an example embodiment of the present disclosure, a range of a plurality of bit numbers may be preset, and each range section corresponds to a target length. The bit numbers in a certain range correspond to the same target length.

In an example embodiment of the present disclosure, the length of the message header is 4. The block 308 may include the following sub-steps:

Sub-step S3002, if the target bit number is less than or equal to 7, the target length is set to 1.

The target bit number is less than or equal to 7, indicating that the length of the message body ranges from 0 bytes to 127 bytes (1111111). The corresponding target length may be set to 1 byte in length.

Sub-step S3004, if the target bit number is greater than 7 and less than or equal to 15, the target length is set to 2.

The target bit number is greater than 7 and less than or equal to 14, indicating that the length of the message body ranges from 128 bytes (1000 0000) to 16383 bytes (11 1111 1111 1111). The corresponding target length may be set to 2 bytes in length.

Sub-step S3006, if the target bit number is greater than 14 and less than or equal to 21, the target length is set to 3.

The target bit number is greater than 14 and less than or equal to 21, indicating that the length of the message body ranges from 16384 bytes (100 0000 0000 0000) to 2097151 bytes (1 1111 1111 1111 1111 1111). The corresponding target length may be set to 3 bytes in length.

Sub-step S3008, if the target bit number is greater than 21 and less than or equal to 29, the target length is set to 4.

The target bit number is greater than 21 and less than or equal to 29, indicating that the byte length of the message body ranges from 2097152 bytes (10 0000 0000 0000 0000 0000) to 536870911 bytes (1 1111 1111 1111 1111 1111 1111 1111). The corresponding target byte length may be set to 4 bytes in length.

If the target bit number is greater than 21 and less than or equal to 29, indicating that the length of the message header is still 4 bytes, and no compression is required.

In an example of the embodiment of the present disclosure, the length of the message header may also be 6 bytes, 8 bytes, or the like. As long as some bytes in the message header are not used to indicate the length of the message body, the message header can be compressed by the method of the present disclosure. For example, when the length of the message header is 6 bytes and the target length is 4 bytes, the message header is compressed from 6 bytes to 4 bytes.

At block 310, the first process compresses the length of the message header to the target length.

In an example embodiment of the present disclosure, the block 310 may include the following sub-steps:

Sub-step S3010, the first process sets the length of the message header to the target length.

In an example embodiment of the present disclosure, the length of the message header may be 4 bytes.

If the target length is 3 bytes, the first process sets the length of the message header from 4 bytes to 3 bytes. If the target length is 4 bytes, the first process still keeps the length of the message header to 4 bytes.

Sub-step S3012, the first process sets the values of the specific bits of the message header according to the target length, and uses the remaining bits excluding the specific bits of the message header to indicate the length of the message body.

The target bit sequence is the shortest bit sequence indicating the length of the message body.

A corresponding relationship between the values of the specific bits and the target length can be set in advance.

In an example embodiment of the present disclosure, the sub-step S3012 may include:

Sub-step S30002, if the target length is 1, the first bit of the message header is set to 0, and the last 7 bits of the message header are used to indicate the length of the message body;

For example, if the target length is 1 byte, that is, the message header includes only one byte, the first process sets the first bit of the byte to zero.

If the target bit sequence is 1111, the corresponding decimal value is 15. The last 7 bits of the message header are used to indicate the length of the message body.

The first process sets the last 7 bits of the message header to 000 1111. The complete message header is 0000 1111. The message header indicates that the corresponding message body has the length of 15 bytes.

Sub-step S30004, if the target length is 2, the first bit of the first byte of the message header is set to 1, and the second bit is set to 0. The values of the last 6 bits of the first byte and all bits of the second byte are used to indicate the length of the message body.

For example, if the target length is 2 bytes, that is, the message header includes two bytes, the first process sets the first bit of the byte to 1 and the second bit to 0.

If the target bit sequence is 100 0000 0000, the corresponding decimal value is 1024.

In the message header, the last 6 bits of the first byte and the second byte are used to indicate the length of the message body.

The first process sets the last 6 bits of the first byte of the message header to 00 0100 and the second byte to 0000 0000. The complete message header is 1000 0100 0000 0000. The message header indicates that the corresponding message body has the length of 1024 bytes.

Sub-step S30006, if the target length is 3, the first bit of the first byte of the message header is set to 1, the second bit is set to 1, and the third bit is set to 0. The values of the last 5 bits of the first byte and all bits of the second byte and the third byte are used to indicate the length of the message body.

For example, if the target length is 3 bytes, the first process sets the first bit of the first byte of the message header to 1, the second bit to 1, and the third bit to 0.

If the target bit sequence is 1100 0000 0000 0000, the corresponding decimal value is 49152.

In the message header, the last 5 bits of the first bytes, the second byte, and the third byte are used to indicate the length of the message body.

The first process sets the last 5 bits of the first byte of the message header to 0 0000, the second byte to 1100 0000, and the third byte to 0000 0000. The complete message header is 1100 0000 1100 0000 0000 0000. The message header indicates that the corresponding message body is 49152 bytes in length.

Sub-step S30008, if the target length is 4, the first bit of the first byte of the message header is set to 1, the second bit is set to 1, and the third bit is set to 1. The values of the last 5 bits of the first byte, and all bits of the second byte, the third byte, and the fourth byte are used to indicate the length of the message body.

For example, if the target length is 4 bytes, the first process sets the first bit of the first byte of the message header to 1, the second bit to 1, and the third bit to 1.

If the target bit sequence is 110 0000 0000 0000 0000 0000, the decimal value corresponding to the message header is 6291456.

The values of the last 5 bits of the first byte, and all bits of the second byte, the third byte, and the fourth byte of the message header are used to indicate the length of the message body.

The first process sets the last 5 bits of the first byte of the message header to 0 0000, the second byte to 0110 0000, the third byte to 0000 0000, and the fourth word to 0000 0000. The complete message header is 1110 0000 0110 0000 0000 0000 0000. The message header indicates that the length of the corresponding message body is 6291456 bytes.

In an example of the embodiment of the present disclosure, when the target lengths are different values, different values of specific bits of the first byte may be used to indicate the target length, and the remaining bits excluding the specific bits of the message header are used to indicate the length of the message body.

At block 312, the first process adds the compressed message to the message queue pre-created for a second process, where the second process is configured to obtain a compressed message from the message queue.

The first process needs to establish the message queue in advance before sending the message to the second process. After the message queue is created, the compressed message is added to the message queue. The second process reads the compressed message from the message queue, thereby completing the process of sending and receiving messages.

In an example embodiment of the present disclosure, during the process of sending and receiving the message through the message queue of any two processes, the sender process performs compression process on the message header according to the length of the message body and the length of the message header of the original message to be sent, and deletes the bytes in the message header that are not needed to indicate the length of the message body, reducing the length of the compressed message header. Therefore, the length of the message stored in the message queue is reduced, and the occupation of the memory resource is reduced.

Referring to FIG. 4, a flow chart of the steps of Embodiment 3 of the method 400 for communication between processes of the present disclosure is shown, which may include the following:

At block 402, the second process determines the length of the message header of the compressed message, where the compressed message includes a message header and a message body.

In an example embodiment of the present disclosure, the length is a byte length.

In an example embodiment of the present disclosure, when the first process sends the message through the message queue to the second process, the first process compresses the original message to be sent to generate a compressed message. The message includes two parts, a message header of a former part and a message body of a latter part.

For the process of generating the compressed message, the above Embodiment 1 and Embodiment 2 may be referred to, and details are not described herein.

The message header may include one or more bytes, and one byte further includes 8 bits. The values of the respective bits of the respective bytes of the message header may indicate the length of the message body.

At block 404, the second process reads, according to the length of the message header of the compressed message, the message header of the compressed message from the message queue pre-created by the first process for the second process.

The first process needs to establish the message queue in advance before sending the message to the second process. After the message queue is created, the compressed message is added to the message queue. The second process reads the compressed message from the message queue, thereby completing the process of sending and receiving messages.

The second process may read the content with the corresponding length from the message queue as the message header of the compressed message according to the length of the message header.

At block 406, the second process determines the length of the message body according to the message header of the compressed message.

In an example embodiment of the present disclosure, the content of the message header of the compressed message may indicate the length of the message body.

At block 408, the second process reads the content with the corresponding length from the message queue as the message body according to the length of the message body.

The second process reads the content with the corresponding length from the message queue as the message body according to the length of the message body, thereby completing the reading of the message.

In an example embodiment of the present disclosure, during the process of sending and receiving the message through the message queue of any two processes, the sender process performs compression process on the message header according to the length of the message body and the length of the message header of the original message to be sent, and deletes the bytes in the message header that are not needed to indicate the length of the message body, reducing the length of the compressed message header. Therefore, the length of the message stored in the message queue is reduced, and the occupation of the memory resource is reduced.

When the receiver process reads the message from the message queue, the message header is read from the message queue according to the length of the message header. Then, according to the content of the message header, the message body is read from the message queue, thereby completing the receiving of the message.

Referring to FIG. 5, a flow chart of the steps of Embodiment 4 of the method 500 for communication between processes of the present disclosure is shown, which may include the following:

At block 502, the second process reads the values of the bits one by one from the message queue pre-created by the first process until the values of the read bits satisfy a preset condition.

In an example embodiment of the present disclosure, when the first process sends the message through the message queue to the second process, the first process compresses the original message to be sent to generate a compressed message. The message includes two parts, a message header of a former part and a message body of a latter part.

For the process of generating the compressed message, the above Embodiment 1 and Embodiment 2 may be referred to, and details are not described herein.

The content in the message queue is arranged in a first-in-first-out order. When the second process reads a new message from the message queue, the second process reads the values of the bits one by one from the head of the message queue, until the values of the read bits satisfy the preset condition.

The second process determines, starting from the first read bit, whether the values of the read bits satisfy the preset condition. In an example embodiment of the present disclosure, the preset condition may include multiple conditions, and one preset condition only corresponds to one scenario of the values of the read bits.

The preset condition may be that the values of the bits read by the second process satisfy a preset value.

At block 504, when the values of the read bits satisfy the preset condition, the second process determines the length of the message header of the compressed message according to the values of respective read bits, where the compressed message includes a message header and a message body.

In an example embodiment of the present disclosure, the length is a byte length.

Every scenario of the values of the read bits when the preset condition is satisfied corresponds to one scenario of the length of the message header. The second process may determine the length of the message header of the compressed message according to the values of the read bits when the preset condition is satisfied. In an example embodiment of the present disclosure, the block 504 may include the following sub-steps:

Sub-step S5002, if the value of the first bit is 0, the second process determines the length of the message header as 1.

In an example embodiment of the present disclosure, the preset condition may include that the value of the first bit is 0. if the value of the first bit is 0, the second process determines the length of the message header as 1 byte.

Sub-step S5004, if the value of the first bit is 1, and the value of the second bit is 0, the second process determines the length of the message header as 2.

The preset condition may further include that the value of the first bit is 1 and the value of the second bit is 0. if the value of the first bit is 1 and the value of the second bit is 0, the second process determines the length of the message header as 2 bytes.

Sub-step S5006, if the value of the first bit is 1, the value of the second bit is 1, and the value of the third bit is 0, the second process determines the length of the message header as 3.

The preset condition may further include that the value of the first bit is 1, the value of the second bit is 1, and the value of the third bit is 0. if the value of the first bit is 1, the value of the second bit is 1, and the value of the third bit is 0, the second process determines the length of the message header as 3 bytes.

Sub-step S5008, if the value of the first bit is 1, the value of the second bit is 1, and the value of the third bit is 1, the second process determines the length of the message header as 4.

The preset condition may further include that the value of the first bit is 1, the value of the second bit is 1, and the value of the third bit is 1. if the value of the first bit is 1, the value of the second bit is 1, and the value of the third bit is 1, the second process determines the length of the message header to be 4 bytes.

At block 506, the second process reads the values of a first number of bits from the message queue according to the length of the message header of the compressed message. The first number is the number of bits corresponding to the length of the message header subtracting the number of bits read when the preset condition is satisfied.

In an example embodiment of the present disclosure, one byte includes 8 bits. The first number is the number of bits corresponding to the length of the message header subtracting the number of bits read when the preset condition is satisfied.

For example, if the length of the message header is 2 bytes, the corresponding bit number is 16. When the preset condition is satisfied, the number of bits that have been read is 2, and the first number is 16−2=14.

At block 508, the second process adds the value of the first bit to the value of the bit read when the preset condition is satisfied as the message header of the compressed message.

The second process may add the value of the bit read when the preset condition is satisfied to the value of the first bit in the order of the reading order as the message header of the compressed message.

At block 510, the second process determines the length of the message body according to the message header of the compressed message.

The values of the bits of the message header of the compressed message may be used to indicate the length of the message body.

In an example embodiment of the present disclosure, the block 510 may include:

The second process determines the length of the message body according to the values of the specific bits of the message header of the compressed message, including:

If the length of the message header is 1, the second process determines the length of the message body using the values of the last 7 bits of the message header.

If the length of the message header is 2, the second process determines the length of the message body using the values of the last 6 bits of the first byte and the values of all bits of the second byte of the message header.

If the length of the message header is 3, the second process determines the length of the message body using the values of the last 5 bits of the first byte, and the values of all bits of the second byte and the third byte of the message header.

If the length of the message header is 4, the second process determines the length of the message body using the values of the last 5 bits of the first byte, and the values of all bits of the second byte, the third byte, and the fourth byte of the message header.

At block 512, the second process reads the content with the corresponding length from the message queue as the message body according to the length of the message body.

The second process reads the values of the bits with the corresponding length from the message queue as the message body according to the length of the message body, thereby completing the reading of the message.

In an example embodiment of the present disclosure, during the process of sending and receiving the message through the message queue of any two processes, the sender process performs compression process on the message header according to the length of the message body and the length of the message header of the original message to be sent, and deletes the bytes in the message header that are not needed to indicate the length of the message body, reducing the length of the compressed message header. Therefore, the length of the message stored in the message queue is reduced, and the occupation of the memory resource is reduced.

When the receiver process reads the message from the message queue, the receiver process reads the message header from the message queue according to the length of the message header. Then, according to the content of the message header, the message body is read from the message queue, thereby completing the reception of the message.

In order to enable those skilled in the art to better understand the embodiment of the present disclosure, the embodiment of the present disclosure is described below by way of an example:

During the process of sending and receiving the message through the message queue of any two processes, the sender process first compresses the message header according to the byte length of the message body of the message to be sent and the original byte length of the message header. The bytes in the message header that are not needed to indicate the length of the message body are deleted, reducing the byte length of the compressed message header.

The process of compressing the message by the message sender process may include:

The byte length of the message header of the original message is 4.

When the byte length of the message body is in the range of 0-127, only a 1-byte message header is used to indicate the byte length of the message body, and the 4 bytes are compressed to 1 byte. In the compressed message header, the value of the first bit is 0, indicating that the message header has only 1 byte. The last 7 bits of the message header may be used to indicate that the message body has the byte length in the range of 0-127.

When the byte length of the message body is in the range of 128-16383, a 2-byte message header may be used to indicate the byte length of the message body, and the 4 bytes are compressed to 2 bytes. In the compressed message header, the value of the first bit of the first byte is 1, and the value of the second bit of the first byte is 0, indicating that the message header has 2 bytes. The last 6 bits of the first byte and the second byte may be used to indicate that the message body has the byte length in the range of 128-16383.

When the byte length of the message body is in the range of 16384-2097151, a 3-byte message header may be used to indicate the byte length of the message body, and the 4 bytes are compressed into 3 bytes. In the compressed message header, the value of the first bit of the first byte is 1, the value of the second bit of the first byte is 1, and the value of the third bit of the first byte is 0, indicating that the message header has 3 bytes. The last 5 bits of the first byte, the second byte, and the third byte may be used to indicate that the message body has the byte length in the range of 16384-2097151.

When the byte length of the message body is in the range of 209715-536870911, a 4-byte message header may be used to indicate the byte length of the message body. In the message header, the value of the first bit of the first byte is 1, the value of the second bit of the first byte is 1, and the value of the third bit of the first byte is 1, indicating that the message header has 4 bytes. The last 5th bits of the first byte, the second byte, the third byte, and the fourth byte may be used to indicate that the message body has the byte length in the range of 209715-536870911.

Figure 6:
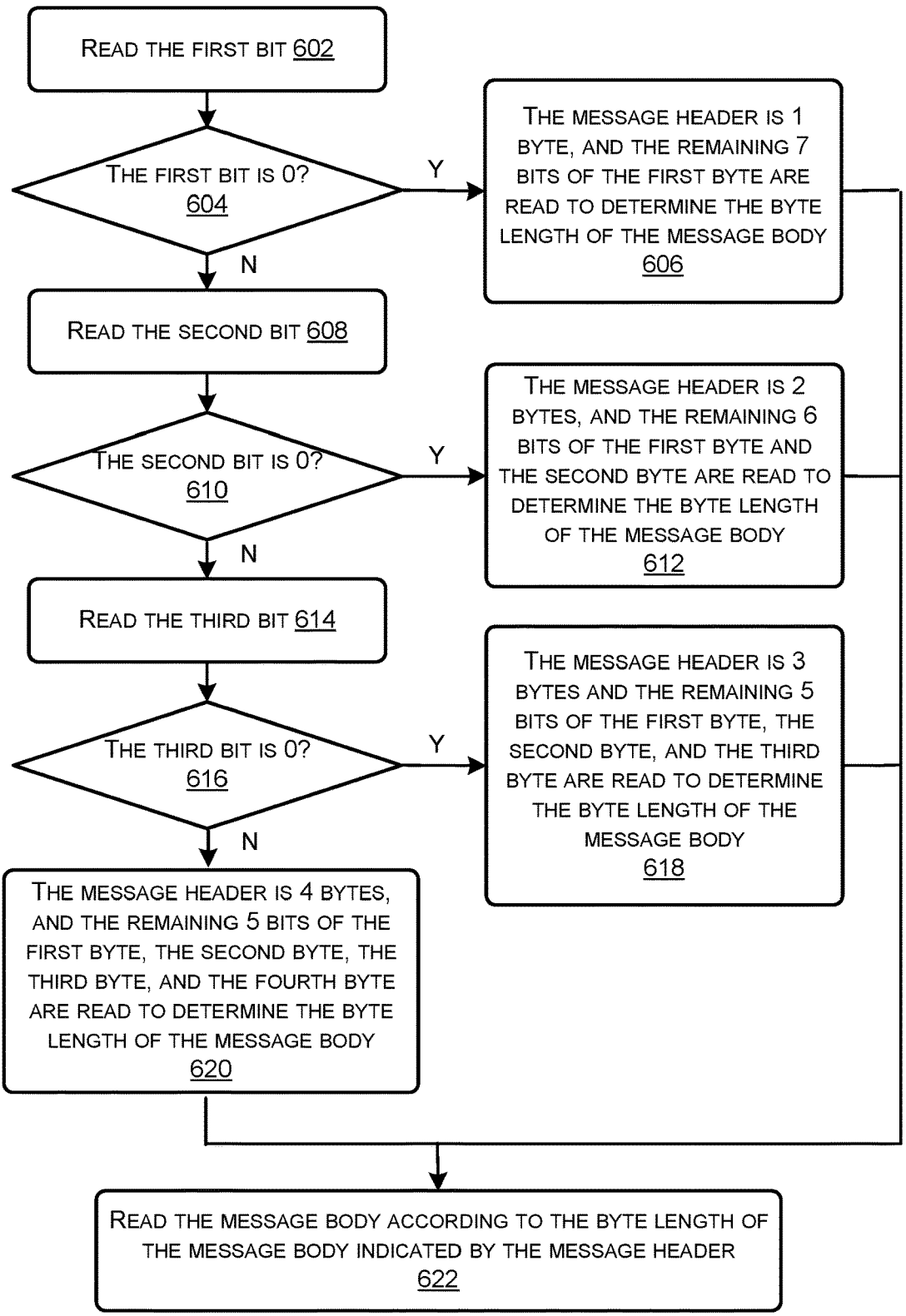
FIG. 6 is a schematic diagram of a process for reading the message from the message queue in an example embodiment of the present disclosure.

Referring to FIG. 6, a schematic diagram of a process 600 for reading the message from the message queue in an example embodiment of the present disclosure is shown. The process 600 by which the receiver process reads the message from the message queue may include:

At block 602, the receiver process reads the first bit in the message queue. At block 604, the receiver process determines whether the first bit is 0. If the value of the first bit is determined as 0 at block 604, indicating that the message header is 1 byte, the receiver process reads the remaining 7 bits of the first byte to determine the byte length of the message body at block 606.

If the value of the first bit is determined as 1 at block 604, the second bit in the message queue is read at block 608. At block 610, the receiver process determines whether the second bit is 0. If the value of the second bit is determined as 0 at block 610, indicating that the message header is 2 bytes, the receiver process reads the remaining 6 bits of the first byte and the second byte to determine the byte length of the message body at block 612.

If the value of the second bit is determined as 1 at block 610, the third bit in the message queue is read at block 614. At block 616, the receiver process determines whether the third bit is 0. If the value of the third bit is determined as 0 at block 616, indicating that the message header is 3 bytes, the receiver process reads the remaining 5 bits of the first byte, the second byte, and the third byte to determine the byte length of the message body at block 618.

If the value of the third bit is determined as 1 at block 616, indicating that the message header is 4 bytes, the receiver process reads the remaining 5 bits of the first byte, the second byte, the third byte, and the fourth byte to determine the byte length of the message body at block 620.

At block 622, the receiver process reads the values of the bits of the corresponding byte length in the message queue as the message body according to the byte length of the message body indicated by the message header.

Referring to FIG. 7, a flow chart of the steps of Embodiment 1 of a method 700 for communication of the present disclosure is shown, which may include the following:

At block 702, the sender obtains an original message to be sent, where the original message includes a message header and a message body.

In an example embodiment of the present disclosure, the sender may be a process in the operating system, or may be various electronic devices (such as a mobile phone, a computer, a tablet), or may be various programs and applications, and the present disclosure is not limited herein.

At block 704, the sender determines the length of the message header and the length of the message body of the original message to be sent.

In an example embodiment of the present disclosure, the length is a byte length.

At block 706, the sender compresses the length of the message header according to the length of the message header and the length of the message body to obtain the compressed message.

At block 708, the sender sends the compressed message to a receiver.

In an example embodiment of the present disclosure, the block 706 may include the following sub-steps:

Sub-step S7002, the sender determines a target bit number, where the target bit number is the number of bits of a target bit sequence, and the target bit sequence is the shortest bit sequence indicating the length of the message body.

Sub-step S7004, the sender determines the target length according to the target bit number.

In an example embodiment of the present disclosure, the length of the message header is 4. The sub-step S7004 may include:

If the target bit number is less than or equal to 7, the target length is set to 1.

If the target bit number is greater than 7 and less than or equal to 14, the target length is set to 2.

If the target bit number is greater than 14 and less than or equal to 21, the target length is set to 3.

If the target bit number is greater than 21 and less than or equal to 29, the target length is set to 4.

Sub-step S7006, the sender compresses the length of the message header to the target length.

In an example embodiment of the present disclosure, the sub-step S7006 may further include:

Sub-step S70002, the sender sets the length of the message header to the target length.

Sub-step S70004, the sender sets the values of the specific bits of the message header according to the target length, and uses the remaining bits excluding the specific bits of the message header to indicate the length of the message body.

In an example embodiment of the present disclosure, the sub-step S70004 may include:

If the target length is 1, the first bit of the message header is set to 0, and the last 7 bits of the message header are used to indicate the length of the message body.

If the target length is 2, the first bit of the first byte of the message header is set to 1, and the second bit is set to 0. The values of the last 6 bits of the first byte and all bits of the second byte are used to indicate the length of the message body.

If the target length is 3, the first bit of the first byte of the message header is set to 1, the second bit is set to 1, and the third bit is set to 0. The values of the last 5 bits of the first byte and all bits of the second byte and the third byte are used to indicate the length of the message body.

If the target length is 4, the first bit of the first byte of the message header is set to 1, the second bit is set to 1, and the third bit is set to 1. The values of the last 5 bits of the first byte, and all bits of the second byte, the third byte, and the fourth byte are used to indicate the length of the message body.

Referring to FIG. 8, a flow chart of the steps of Embodiment 2 of a method 800 for communication of the present disclosure is shown, which may include the following:

At block 802, the receiver determines the length of the message header of the compressed message, where the compressed message includes a message header and a message body.

In an example embodiment of the present disclosure, the length is a byte length.

In an example embodiment of the present disclosure, the block 802 may include the following sub-steps:

Sub-step S8002, the receiver reads the values of the bits one by one from the message queue until the values of the read bits satisfy a preset condition.

Sub-step S8004, when the values of the read bits satisfy the preset condition, the receiver determines the length of the message header of the compressed message according to the values of respective read bits.

In an example embodiment of the present disclosure, the sub-step S8004 may include:

If the value of the first bit is 0, the receiver determines the length of the message header as 1.

If the value of the first bit is 1 and the value of the second bit is 0, the receiver determines the length of the message header as 2.

If the value of the first bit is 1, the value of the second bit is 1, and the value of the third bit is 0, the receiver determines the length of the message header as 3.

If the value of the first bit is 1, the value of the second bit is 1, and the value of the third bit is 1, the receiver determines the length of the message header as 4.

At block 804, the receiver reads, according to the length of the message header of the compressed message, the message header of the compressed message from the message queue pre-created by the sender for the receiver.

In an example embodiment of the present disclosure, the block 804 may include the following sub-steps:

Sub-step S8006, the receiver reads the values of a first number of bits from the message queue according to the length of the message header of the compressed message. The first number is the number of bits corresponding to the length of the message header subtracting the number of bits read when the preset condition is satisfied.

Sub-step S8008, the receiver adds the value of the first bit to the value of the bit read when the preset condition is satisfied as the message header of the compressed message.

At block 806, the receiver determines the length of the message body according to the message header of the compressed message.

In an example embodiment of the present disclosure, the block 806 may include:

The receiver determines the length of the message body according to the values of the specific bits of the message header of the compressed message.

In an example embodiment of the present disclosure, determining, by the receiver, the length of the message body according to the values of the specific bits of the message header of the compressed message includes:

If the length of the message header is 1, the receiver determines the length of the message body using the values of the last 7 bits of the message header.

If the length of the message header is 2, the receiver determines the length of the message body using the values of the last 6 bits of the first byte and the values of all bits of the second byte of the message header.

If the length of the message header is 3, the receiver determines the length of the message body using the values of the last 5 bits of the first byte, and the values of all bits of the second byte and the third byte of the message header.

If the length of the message header is 4, the receiver determines the length of the message body using the values of the last 5 bits of the first byte, and the values of all bits of the second byte, the third byte, and the fourth byte of the message header.

At block 608, the receiver reads the content with the corresponding length from the message queue as the message body according to the length of the message body.

Referring to FIG. 9, a flow chart of the steps of Embodiment 5 of the method 900 for communication between processes of the present disclosure is shown, which may include the following:

At block 902, the first process obtains an original message to be sent, where the original message includes a message header and a message body.

At block 904, the first process compresses the length of the message header according to the length of the message header and the length of the message body to obtain the compressed message.

In an example embodiment of the present disclosure, the length is a byte length.

In an example embodiment of the present disclosure, the block 904 may include the following sub-steps:

Sub-step S9002, the first process determines a target bit number, where the target bit number is the number of bits of a target bit sequence, and the target bit sequence is the shortest bit sequence indicating the length of the message body.

Sub-step S9004, the first process determines the target length according to the target bit number.

In an example embodiment of the present disclosure, the sub-step S9004 may include:

If the target bit number is less than or equal to 7, the target length is set to 1.

If the target bit number is greater than 7 and less than or equal to 14, the target length is set to 2.

If the target bit number is greater than 14 and less than or equal to 21, the target length is set to 3.

If the target bit number is greater than 21 and less than or equal to 29, the target length is set to 4.

Sub-step S9006, the first process compresses the length of the message header to the target length.

In an example embodiment of the present disclosure, the sub-step S9006 may include:

The first process sets the length of the message header to the target length.

The first process sets the values of the specific bits of the message header according to the target length, and uses the remaining bits excluding the specific bits of the message header to indicate the length of the message body.

In an example embodiment of the present disclosure, the first process sets the values of the specific bits of the message header according to the target length, and uses the remaining bits excluding the specific bits of the message header to indicate the length of the message body, including:

If the target length is 1, the first bit of the message header is set to 0, and the last 7 bits of the message header are used to indicate the length of the message body.

If the target length is 2, the first bit of the first byte of the message header is set to 1, and the second bit is set to 0. The values of the last 6 bits of the first byte and all bits of the second byte are used to indicate the length of the message body.

If the target length is 3, the first bit of the first byte of the message header is set to 1, the second bit is set to 1, and the third bit is set to 0. The values of the last 5 bits of the first byte and all bits of the second byte and the third byte are used to indicate the length of the message body.

If the target length is 4, the first bit of the first byte of the message header is set to 1, the second bit is set to 1, and the third bit is set to 1. The values of the last 5 bits of the first byte, and all bits of the second byte, the third byte, and the fourth byte are used to indicate the length of the message body.

At block 906, the first process adds the compressed message to the message queue pre-created for the second process, where the second process is configured to obtain a compressed message from the message queue.

Figure 10:
FIG. 10 is a flow chart showing the steps of an example embodiment of a method for message compression according to the present disclosure.

Referring to FIG. 10, a flow chart of the steps of an example embodiment of a method 1000 for message compression of the present disclosure is shown, which may include the following:

At block 1002, obtaining an original message, where the original message includes a message header and a message body.

At block 1004, compressing the length of the message header according to the length of the message header and the length of the message body to obtain the compressed message.

In an example embodiment of the present disclosure, the length is a byte length.

In an example embodiment of the present disclosure, the block 1002 may include the following sub-steps:

Sub-step S10002, determining a target bit number, where the target bit number is a bit number of the target bit sequence, and the target bit sequence is the shortest bit sequence indicating the length of the message body.

Sub-step S10004, determining a target length according to the target bit number.

In an example embodiment of the present disclosure, the length of the message header is 4. The sub-step S10004 may include:

If the target bit number is less than or equal to 7, the target length is set to 1. If the target bit number is greater than 7 and less than or equal to 14, the target length is set to 2.

If the target bit number is greater than 14 and less than or equal to 21, the target length is set to 3.

If the target bit number is greater than 21 and less than or equal to 29, the target length is set to 4.

Sub-step S10006, compressing the length of the message header to the target length.

In an example embodiment of the present disclosure, the sub-step S10006 may include:

Setting the length of the message header to the target length; and

Setting the values of the specific bits of the message header according to the target length, and using the remaining bits excluding the specific bits of the message header to indicate the length of the message body.

In an example embodiment of the present disclosure, setting the values of the specific bits of the message header according to the target length, and using the remaining bits excluding the specific bits of the message header to indicate the length of the message body may include:

If the target length is 1, the first bit of the message header is set to 0, and the last 7 bits of the message header are used to indicate the length of the message body.

If the target length is 2, the first bit of the first byte of the message header is set to 1, and the second bit is set to 0. The values of the last 6 bits of the first byte and all bits of the second byte are used to indicate the length of the message body.

If the target length is 3, the first bit of the first byte of the message header is set to 1, the second bit is set to 1, and the third bit is set to 0. The values of the last 5 bits of the first byte and all bits of the second byte and the third byte are used to indicate the length of the message body.

If the target length is 4, the first bit of the first byte of the message header is set to 1, the second bit is set to 1, and the third bit is set to 1. The values of the last 5 bits of the first byte, and all bits of the second byte, the third byte, and the fourth byte are used to indicate the length of the message body.

Referring to FIG. 11, a flow chart of the steps of Embodiment 6 of the method 1100 for communication between processes of the present disclosure is shown, which may include the following:

At block 1102, the first process obtains the length of the message content to be sent.

In an example embodiment of the present disclosure, the length is a byte length.

At block 1104, the first process generates a corresponding message header according to the length of the message content.

In an example embodiment of the present disclosure, the block 1104 may include the following sub-steps:

Sub-step S11002, the first process determines the length of the message header according to the length of the message content.

In an example embodiment of the present disclosure, the sub-step S11002 may include:

The first process determines a target bit number according to the length of the message content, where the target bit number is the number of bits of a target bit sequence, and the target bit sequence is the shortest bit sequence indicating the length of the message body.

The first process determines the target length according to the target bit number.

In an example embodiment of the present disclosure, the length of the message header is 4. The step of determining the target length according to the target bit number may include:

If the target bit number is less than or equal to 7, the target length is set to 1.

If the target bit number is greater than 7 and less than or equal to 14, the target length is set to 2.

If the target bit number is greater than 14 and less than or equal to 21, the target length is set to 3.

If the target bit number is greater than 21 and less than or equal to 29, the target length is set to 4.

Sub-step S11004, the first process generates the message header according to the length of the message header.

Sub-step S11006, the first process sets the values of the specific bits of the message header according to the length of the message header, and uses the remaining bits excluding the specific bits of the message header to indicate the length of the message content.

In an example embodiment of the present disclosure, the sub-step S11006 may include:

If the length of the message header is 1, the first bit of the message header is set to 0, and the last 7 bits of the message header are used to indicate the length of the message body.

If the length of the message header is 2, the first bit of the first byte of the message header is set to 1, and the second bit is set to 0. The values of the last 6 bits of the first byte and all bits of the second byte are used to indicate the length of the message body.

If the length of the message header is 3, the first bit of the first byte of the message header is set to 1, the second bit is set to 1, and the third bit is set to 0. The values of the last 5 bits of the first byte and all bits of the second byte and the third byte are used to indicate the length of the message body.

If the length of the message header is 4, the first bit of the first byte of the message header is set to 1, the second bit is set to 1, and the third bit is set to 1. The values of the last 5 bits of the first byte, and all bits of the second byte, the third byte, and the fourth byte are used to indicate the length of the message body.

At block 1106, the first process generates a message to be sent according to the message header and the message content.

At block 1108, the first process adds the message to be sent to the message queue pre-created for the second process, where the second process is configured to obtain the message from the message queue.

Figure 12:
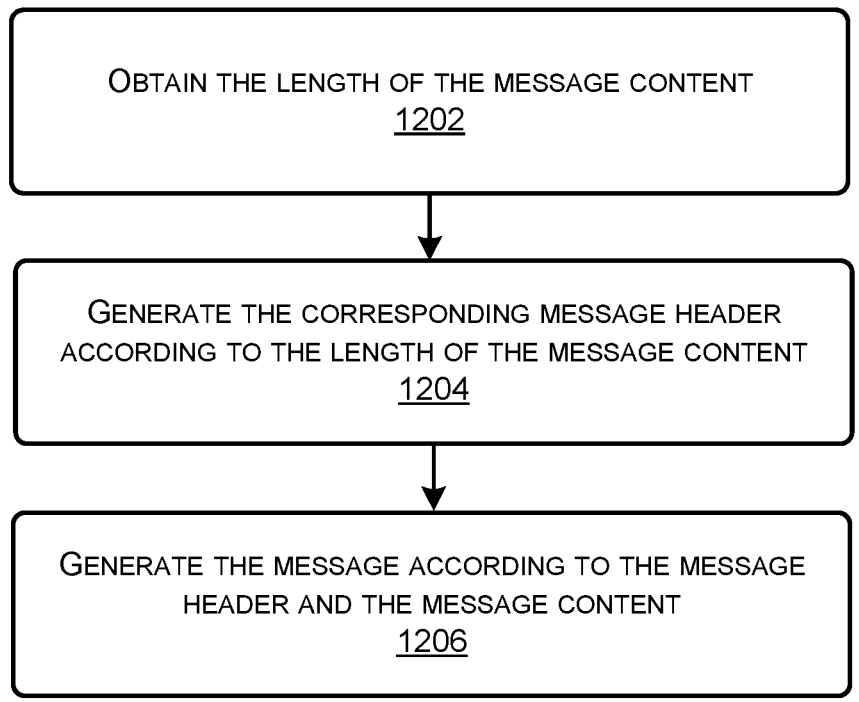
FIG. 12 is a flow chart showing the steps of an example embodiment of a message generating method of the present disclosure.

Referring to FIG. 12, a flow chart of the steps of an example embodiment of a message generating method 1200 of the present disclosure is shown, which may include the following:

At block 1202, obtaining the length of the message content.

In an example embodiment of the present disclosure, the length is a byte length.

At block 1204, generating the corresponding message header according to the length of the message content.

In an example embodiment of the present disclosure, the block 1202 may include the following sub-steps:

Sub-step S12002, determining the length of the message header according to the length of the message content.

Sub-step S12004, generating the message header according to the length of the message header.

Sub-step S12006, setting the values of the specific bits of the message header according to the length of the message header, and using the remaining bits excluding the specific bits of the message header to indicate the length of the message body.

In an example embodiment of the present disclosure, the sub-step S12006 may include:

If the length of the message header is 1, the first bit of the message header is set to 0, and the last 7 bits of the message header are used to indicate the length of the message body.

If the length of the message header is 2, the first bit of the first byte of the message header is set to 1, and the second bit is set to 0. The values of the last 6 bits of the first byte and all bits of the second byte are used to indicate the length of the message body.

If the length of the message header is 3, the first bit of the first byte of the message header is set to 1, the second bit is set to 1, and the third bit is set to 0. The values of the last 5 bits of the first byte and all bits of the second byte and the third byte are used to indicate the length of the message body.

If the length of the message header is 4, the first bit of the first byte of the message header is set to 1, the second bit is set to 1, and the third bit is set to 1. The values of the last 5 bits of the first byte, and all bits of the second byte, the third byte, and the fourth byte are used to indicate the length of the message body.

In an example embodiment of the present disclosure, the sub-step S12004 may include:

determining a target bit number according to the length of the message content, where the target bit number is the number of bits of a target bit sequence, and the target bit sequence is the shortest bit sequence indicating the length of the message body.

The target length is determined according to the target bit number.

In an example embodiment of the present disclosure, the length of the message header is 4. The step of determining the target length according to the target bit number may include:

If the target bit number is less than or equal to 7, the target length is set to 1.

If the target bit number is greater than 7 and less than or equal to 14, the target length is set to 2.

If the target bit number is greater than 14 and less than or equal to 21, the target length is set to 3.

If the target bit number is greater than 21 and less than or equal to 29, the target length is set to 4.

At block 1206, generating the message according to the message header and the message content.

It should be noted that, for the method embodiments, for the sake of simple description, they are all expressed as a series of action combinations, but those skilled in the art should know that the example embodiments of the present disclosure are not subject to the described action sequence. According to example embodiments of the present disclosure, some steps may be performed in other orders or concurrently. Moreover, those skilled in the art should also understand that the embodiments described in the specification are all example embodiments, and the actions involved are not necessarily required in the example embodiments of the present disclosure.

Figure 13:
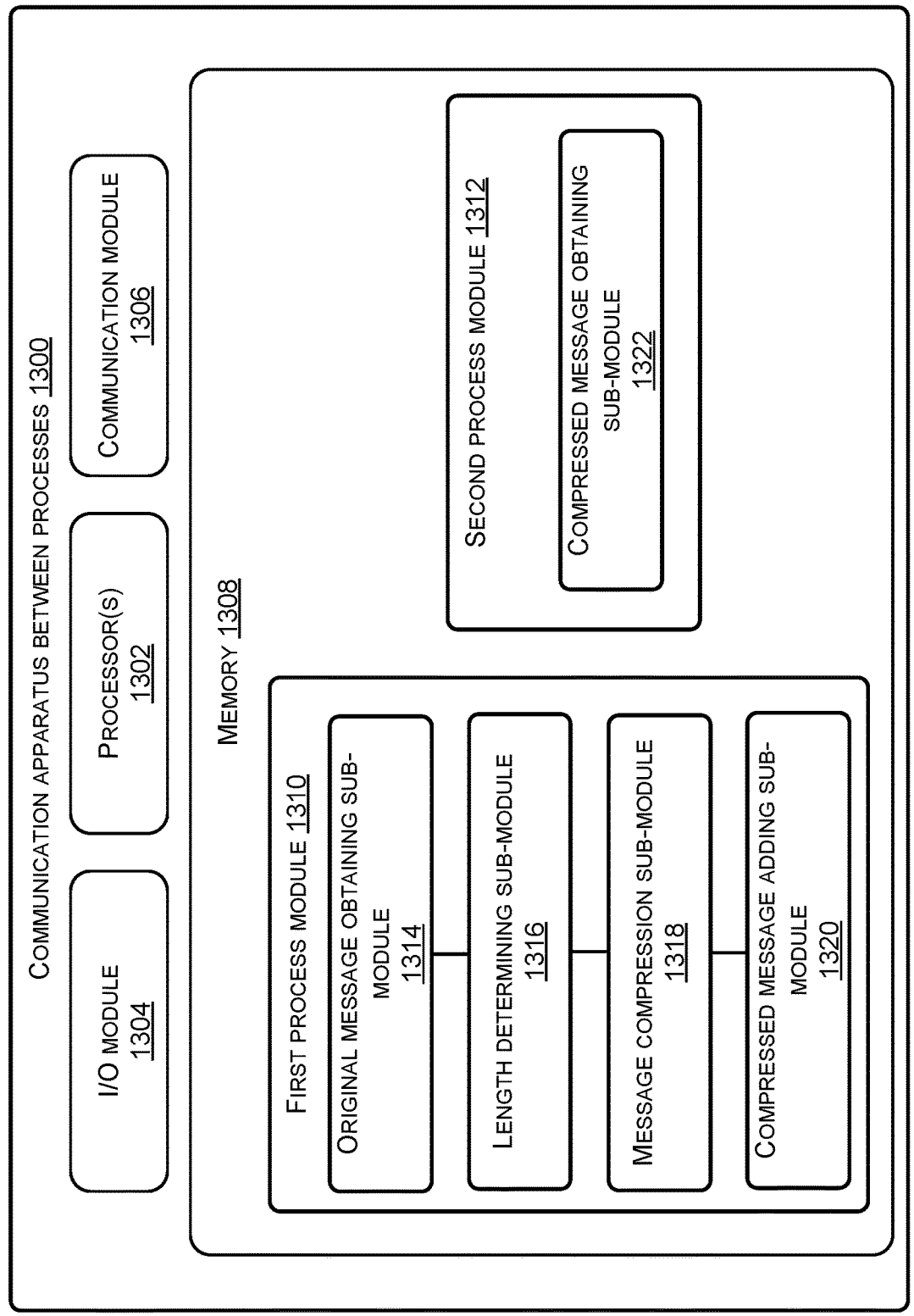
FIG. 13 is a structural block diagram of Embodiment 1 of an apparatus for communication between processes in the present disclosure.

Referring to FIG. 13, a structural block diagram of Embodiment 1 of an apparatus 1300 for communication between processes in the present disclosure is shown. The apparatus 1300 may include one or more processors 1302, an input/output module 1304, a communication module 1306, and a memory 1308. The input/output module 1304 is configured to receive data/signal to be processed and to output the processed data/signal. The communication module 1306 is configured to allow the apparatus 1300 to communicate with other devices (not shown) over a network (not shown). The memory 1308 stores thereon computer-executable modules executable by the one or more processors 1302. The computer-executable modules may include a first process module 1310 and a second process module 1312.

The first process module 1310 may include:

An original message obtaining sub-module 1314 is configured to obtain an original message to be sent, where the original message includes a message header and a message body.

A length determining sub-module 1316 is configured to determine the length of the message header and the length of the message body of the original message to be sent.

In an example embodiment of the present disclosure, the length is a byte length.

A message compression sub-module 1318 is configured to compress the length of the message header according to the length of the message header and the length of the message body to obtain the compressed message.

A compressed message adding sub-module 1320 is configured to add the compressed message to the message queue pre-created for the second process module.

The second process module 1312 may include:

The compressed message obtaining sub-module 1322 is configured to obtain the compressed message from the message queue.

In an example embodiment of the present disclosure, the message compression sub-module 1318 may include:

A target bit number determining unit is configured to determine a target bit number, where the target bit number is a bit number of the target bit sequence, and the target bit sequence is the shortest bit sequence indicating the length of the message body.

A target length determining unit is configured to determine a target length according to the target bit number.

A message compression unit is configured to compress the length of the message header to the target length.

In an example embodiment of the present disclosure, the message compression unit may include:

A length setting subunit is configured to set the length of the message header to the target length.

A bit setting subunit is configured to set the values of the specific bits of the message header according to the target length, and use the remaining bits excluding the specific bits of the message header to indicate the length of the message body.

In an example embodiment of the present disclosure, the length of the message header is 4. The target length determining unit may include:

A first target length determining subunit is configured to set the target length to 1 if the target bit number is less than or equal to 7.

A second target length determining subunit is configured to set the target length to 2 if the target bit number is greater than 7 and less than or equal to 14.

A third target length determining subunit is configured to set the target length to 3 if the target bit number is greater than 14 and less than or equal to 21.

A fourth target length determining subunit is configured to set the target length to 4 if the target bit number is greater than 21 and less than or equal to 29.

In an example embodiment of the present disclosure, the bit setting subunit may include:

A first bit setting component is configured to, if the target length is 1, set the first bit of the message header to 0, and use the last 7 bits of the message header to indicate the length of the message body.

A second bit setting component is configured to, if the target length is 2, set the first bit of the first byte of the message header to 1, and the second bit to 0; and use the values of the last 6 bits of the first byte and all bits of the second byte to indicate the length of the message body.

A third bit setting component is configured to, if the target length is 3, set the first bit of the first byte of the message header to 1, the second bit to 1, and the third bit to 0; and use the values of the last 5 bits of the first byte, and all bits of the second byte and the third byte to indicate the length of the message body.

A fourth bit setting component is configured to, if the target length is 4, set the first bit of the first byte of the message header to 1, the second bit to 1, and the third bit to 1, and use the values of the last 5 bits of the first byte, and all bits of the second byte, the third byte, and the fourth byte to indicate the length of the message body.

In an example embodiment of the present disclosure, during the process of sending and receiving the message through the message queue of any two processes, the sender process performs compression process on the message header according to the length of the message body and the length of the message header of the original message to be sent, and deletes the bytes in the message header that are not needed to indicate the length of the message body, reducing the length of the compressed message header. Therefore, the length of the message stored in the message queue is reduced, and the occupation of the memory resource is reduced. The present disclosure is applicable to an operating system with limited hardware resources or other operation systems with relatively tight resources in the IoT field.

Figure 14:
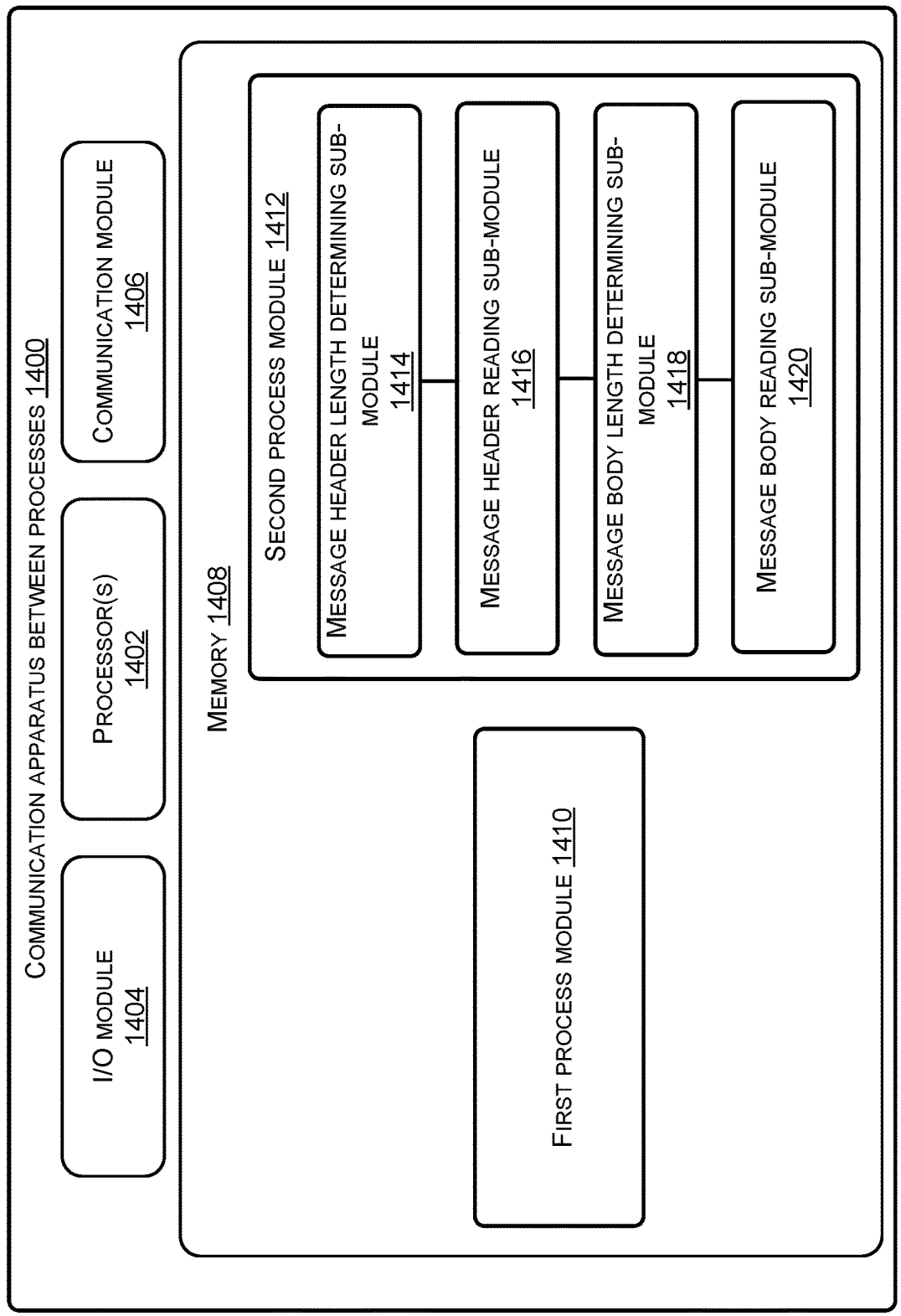
FIG. 14 is a structural block diagram of Embodiment 2 of an apparatus for communication between processes in the present disclosure.

Referring to FIG. 14, is a structural block diagram of Embodiment 2 of an apparatus 1400 for communication between processes in the present disclosure is shown. The apparatus 1400 may include one or more processors 1402, an input/output module 1404, a communication module 1406, and a memory 1408. The input/output module 1404 is configured to receive data/signal to be processed and to output the processed data/signal. The communication module 1406 is configured to allow the apparatus 1400 to communicate with other devices (not shown) over a network (not shown). The memory 1408 stores thereon computer-executable modules executable by the one or more processors 1402. The computer-executable modules may include a first process module 1410 and a second process module 1412.

The second process module 1412 may include:

A message header length determining sub-module 1414 is configured to determine the length of the message header of the compressed message, where the compressed message includes a message header and a message body.

A message header reading sub-module 1416 is configured to read, according to the length of the message header of the compressed message, the message header of the compressed message from the message queue pre-created by the first process module for the second process module.

In an example embodiment of the present disclosure, the length is a byte length.

A message body length determining sub-module 1418 is configured to determine the length of the message body according to the message header of the compressed message.

A message body reading sub-module 1420 is configured to read the content with the corresponding length from the message queue as the message body according to the length of the message body.

In an example embodiment of the present disclosure, the message header length determining sub-module 1414 may include:

A first bit reading unit is configured to read the values of the bits one by one from the message queue until the values of the read bits satisfy a preset condition.

The message header length determining unit is configured to determine the length of the message header of the compressed message according to the values of respective read bits when the values of the read bits satisfy the preset condition.

In an example embodiment of the present disclosure, the message header reading sub-module 1416 may include:

A second bit reading unit is configured to read the values of a first number of bits from the message queue according to the length of the message header of the compressed message. The first number is the number of bits corresponding to the length of the message header subtracting the number of bits read when the preset condition is satisfied.

A message header determining unit is configured to add the value of the first bit to the value of the bit read when the preset condition is satisfied as the message header of the compressed message.

In an example embodiment of the present disclosure, the message body length determining sub-module 1418 may include:

The message body length determining unit is configured to determine the length of the message body according to the values of the specific bits in the message header of the compressed message.

In an example embodiment of the present disclosure, the message header length determining unit may include:

A first message header length determining subunit is configured to determine the length of the message header as 1 if the value of the first bit is 0.

A second message header length determining subunit is configured to determine the length of the message header as 2 if the value of the first bit is 1 and the value of the second bit is 0.

A third message header length determining subunit is configured to determine the length of the message header as 3 if the value of the first bit is 1, the value of the second bit is 1, and the value of the third bit is 0.

A fourth message header length determining subunit is configured to determine the length of the message header as 4 if the value of the first bit is 1, the value of the second bit is 1, and the value of the third bit is 1.

In an example embodiment of the present disclosure, the message body length determining unit may include:

A first message body length determining subunit is configured to determine the length of the message body using the values of the last 7 bits of the message header if the length of the message header is 1.

A second message body length determining subunit is configured to determine the length of the message body using the values of the last 6 bits of the first byte and the values of all bits of the second byte of the message header if the length of the message header is 2.

A third message body length determining subunit is configured to determine the length of the message body using the values of the last 5 bits of the first byte, and the values of all bits of the second byte and the third byte of the message header if the length of the message header is 3.

A fourth message body length determining subunit is configured to determine the length of the message body using the values of the last 5 bits of the first byte, and the values of all bits of the second byte, the third byte, and the fourth byte of the message header if the length of the message header is 4.

In an example embodiment of the present disclosure, during the process of sending and receiving the message through the message queue of any two processes, the sender process performs compression process on the message header according to the length of the message body and the length of the message header of the original message to be sent, and deletes the bytes in the message header that are not needed to indicate the length of the message body, reducing the length of the compressed message header. Therefore, the length of the message stored in the message queue is reduced, and the occupation of the memory resource is reduced. The present disclosure is applicable to an operating system with limited hardware resources or other operation systems with relatively tight resources in the IoT field.

Figure 15:
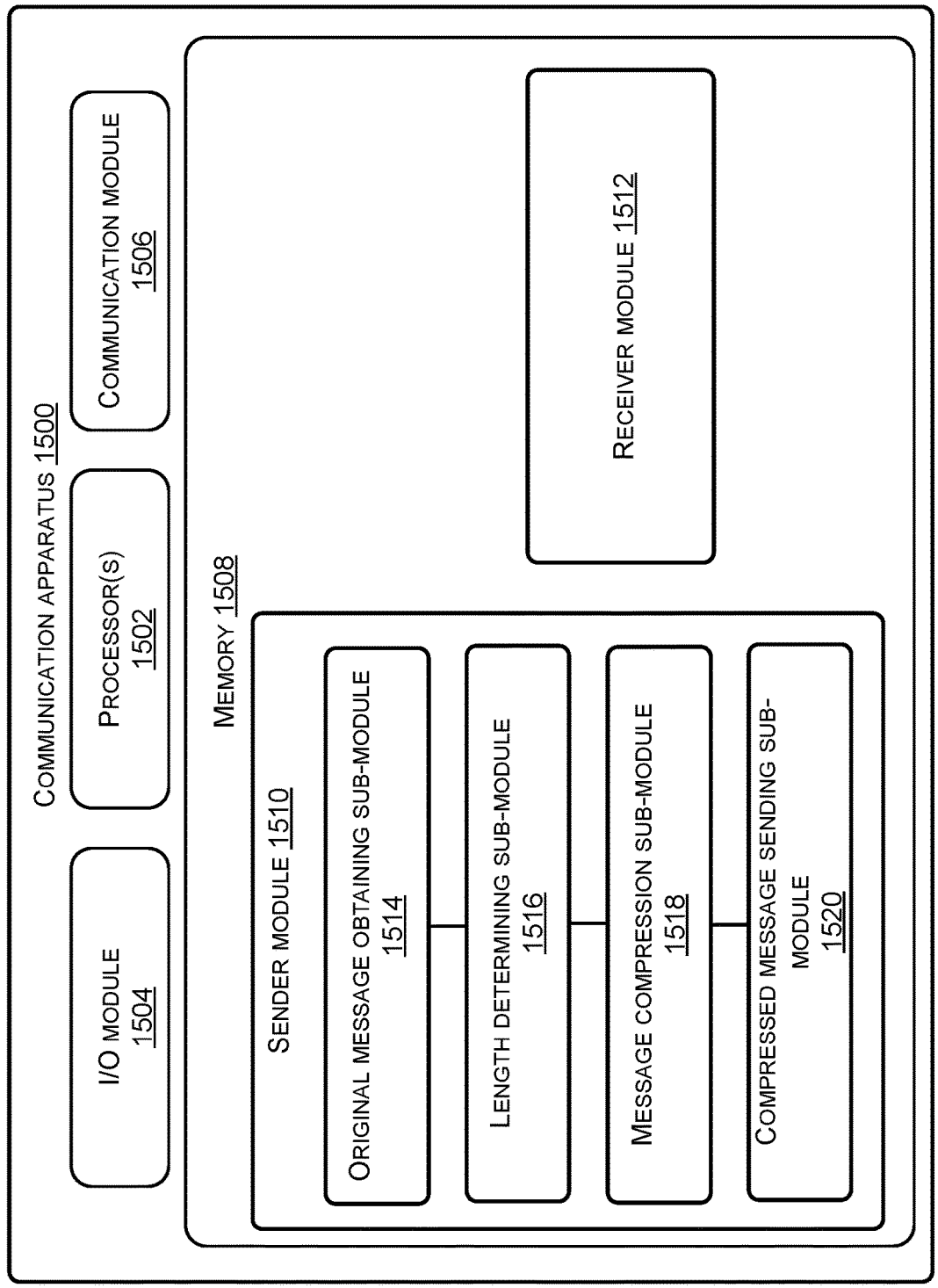
FIG. 15 is a structural block diagram of Embodiment 1 of an apparatus for communication according to the present disclosure.

Referring to FIG. 15, a structural block diagram of Embodiment 1 of an apparatus 1500 for communication according to the present disclosure is shown. The apparatus 1500 may include one or more processors 1502, an input/output module 1504, a communication module 1506, and a memory 1508. The input/output module 1504 is configured to receive data/signal to be processed and to output the processed data/signal. The communication module 1506 is configured to allow the apparatus 1500 to communicate with other devices (not shown) over a network (not shown). The memory 1508 stores thereon computer-executable modules executable by the one or more processors 1502. The computer-executable modules may include a sender module 1510 and a receiver module 1512. The sender module 1510 may include:

An original message obtaining sub-module 1514 is configured to obtain an original message to be sent, where the original message includes a message header and a message body.

A length determining sub-module 1516 is configured to determine the length of the message header and the length of the message body of the original message to be sent.

In an example embodiment of the present disclosure, the length is a byte length.

A message compression sub-module 1518 is configured to compress the length of the message header according to the length of the message header and the length of the message body to obtain the compressed message.

A compressed message sending sub-module 1520 is configured to send the compressed message to the receiver.

In an example embodiment of the present disclosure, the message compression sub-module 1518 may include:

A target bit number determining unit is configured to determine a target bit number, where the target bit number is the number of bits of a target bit sequence, and the target bit sequence is the shortest bit sequence indicating the length of the message body.

A target length determining unit is configured to determine a target length according to the target bit number;

A message compression unit is configured to compress the length of the message header to the target length.

In an example embodiment of the present disclosure, the message compression unit may include:

A length setting subunit is configured to set the length of the message header to the target length.

A bit setting subunit is configured to set the values of the specific bits of the message header according to the target length, and use the remaining bits excluding the specific bits of the message header to indicate the length of the message body.

In an example embodiment of the present disclosure, the length of the message header is 4. The target length determining unit may include:

A first target length determining subunit is configured to set a target length to 1 if the target bit number is less than or equal to 7.

A second target length determining subunit is configured to set the target length to 2 if the target bit number is greater than 7 and less than or equal to 14.

A third target length determining subunit is configured to set the target length to 3 if the target bit number is greater than 14 and less than or equal to 21.

A fourth target length determining subunit is configured to set the target length to 4 if the target bit number is greater than 21 and less than or equal to 29.

In an example embodiment of the present disclosure, the bit setting subunit may include:

A first bit setting component is configured to, if the target length is 1, set the first bit of the message header to 0, and use the last 7 bits of the message header to indicate the length of the message body.

A second bit setting component is configured to, if the target length is 2, set the first bit of the first byte of the message header to 1, and the second bit to 0, and use the values of the last 6 bits of the first byte and all bits of the second byte to indicate the length of the message body.

A third bit setting component is configured to, if the target length is 3, set the first bit of the first byte of the message header to 1, the second bit to 1, and the third bit to 0, and use the values of the last 5 bits of the first byte, and all bits of the second byte and the third byte to indicate the length of the message body.

A fourth bit setting component is configured to, if the target length is 4, set the first bit of the first byte of the message header to 1, the second bit to 1, and the third bit to 1, and use the values of the last 5 bits of the first byte, and all bits of the second byte, the third byte, and the fourth byte to indicate the length of the message body.

Figure 16:
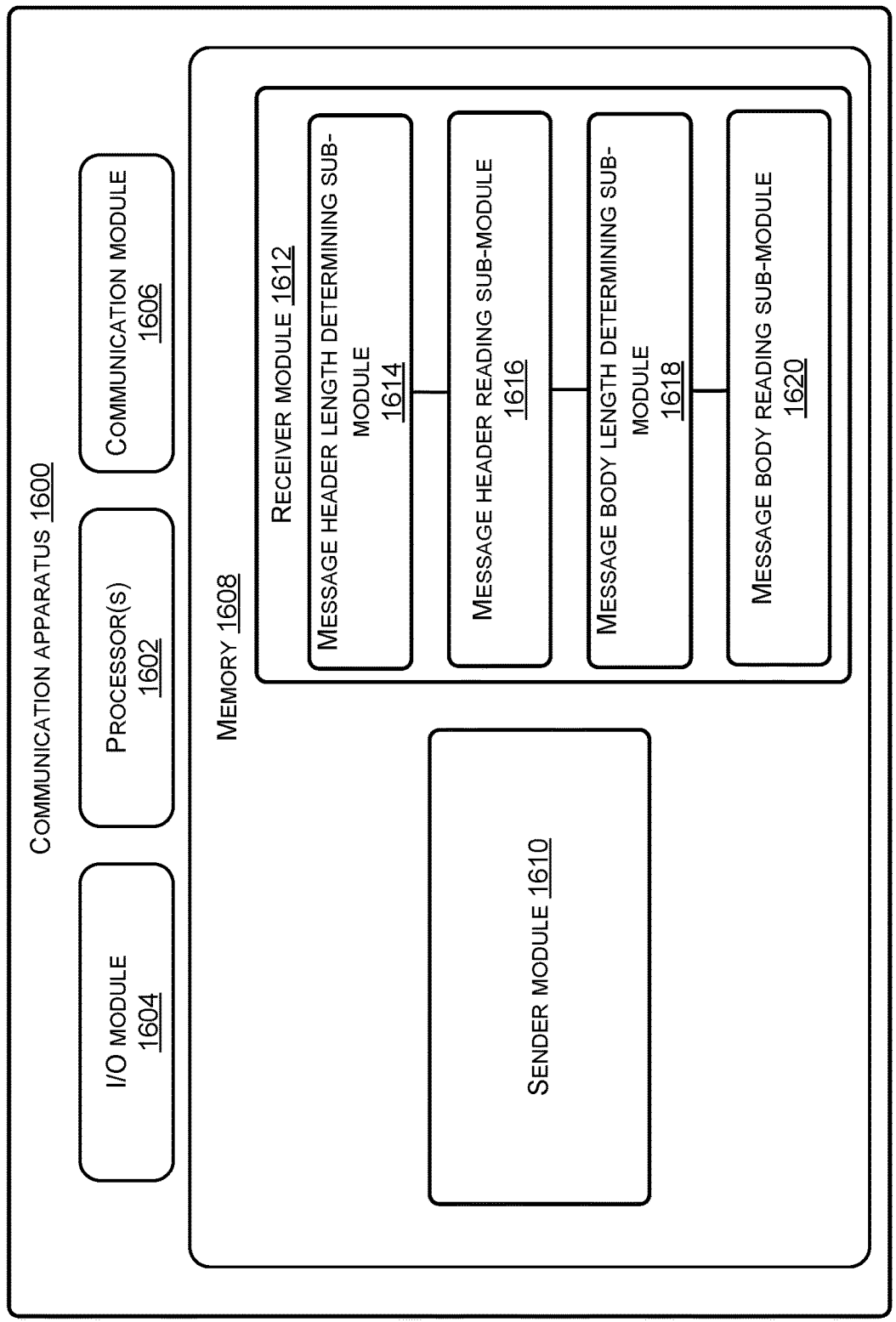
FIG. 16 is a structural block diagram of Embodiment 2 of an apparatus for communication according to the present disclosure.

Referring to FIG. 16, a structural block diagram of Embodiment 2 of an apparatus 1600 for communication according to the present disclosure is shown. The apparatus 1600 may include one or more processors 1602, an input/output module 1604, a communication module 1606, and a memory 1608. The input/output module 1604 is configured to receive data/signal to be processed and to output the processed data/signal. The communication module 1606 is configured to allow the apparatus 1600 to communicate with other devices (not shown) over a network (not shown). The memory 1608 stores thereon computer-executable modules executable by the one or more processors 1602. The computer-executable modules may include a sender module 1610 and a receiver module 1612. The receiver module 1612 may include:

A message header length determining sub-module 1614 is configured to determine the length of the message header of the compressed message, where the compressed message includes a message header and a message body.

A message header reading sub-module 1616 is configured to read the message header of the compressed message from the message queue pre-created by the first process module for the second process module according to the length of the message header of the compressed message.

In an example embodiment of the present disclosure, the length is a byte length.

A message body length determining sub-module 1618 is configured to determine the length of the message body according to the message header of the compressed message.

The message body reading sub-module 1620 is configured to read the content with the corresponding length from the message queue as the message body according to the length of the message body.

In an example embodiment of the present disclosure, the message header length determining sub-module 1614 may include:

A first bit reading unit is configured to read the values of the bits one by one from the message queue until the values of the read bits satisfy a preset condition.

A message header length determining unit is configured to determine the length of the message header of the compressed message according to the values of respective read bits when the values of the read bits satisfy the preset condition.

In an example embodiment of the present disclosure, the message header reading sub-module 1616 may include:

A second bit reading unit is configured to read the values of a first number of bits from the message queue according to the length of the message header of the compressed message. The first number is the number of bits corresponding to the length of the message header subtracting the number of bits read when the preset condition is satisfied.

A message header determining unit is configured to add the value of the first bit to the value of the bit read when the preset condition is satisfied as the message header of the compressed message.

In an example embodiment of the present disclosure, the message body length determining sub-module 1618 may include:

A message body length determining unit is configured to determine the length of the message body according to the values of the specific bits of the message header of the compressed message.

In an example embodiment of the present disclosure, the message header length determining unit may include:

A first message header length determining subunit is configured to determine the length of the message header as 1 if the value of the first bit is 0.

A second message header length determining subunit is configured to determine the length of the message header as 2 if the value of the first bit is 1 and the value of the second bit is 0.

A third message header length determining subunit is configured to determine the length of the message header as 3 if the value of the first bit is 1, the value of the second bit is 1, and the value of the third bit is 0.

A fourth message header length determining subunit is configured to determine the length of the message header as 4 if the value of the first bit is 1, the value of the second bit is 1, and the value of the third bit is 1.

In an example embodiment of the present disclosure, the message body length determining unit may include:

A first message body length determining subunit is configured to, if the length of the message header is 1, determine the length of the message body using the values of the last 7 bits of the message header.

A second message body length determining subunit is configured to, if the length of the message header is 2, determine the length of the message body using the values of the last 6 bits of the first byte and the values all bits of the second byte of the message header.

A third message body length determining subunit is configured to, if the length of the message header is 3, determine the length of the message body using the values of the last 5 bits of the first byte, and the values of all bits of the second byte and the third byte of the message header.

A fourth message body length determining subunit is configured to, if the length of the message header is 4, determine the length of the message body using the values of the last 5 bits of the first byte, and the values of all bits of the second byte, the third bytes, and the fourth byte of the message header.

Figure 17:
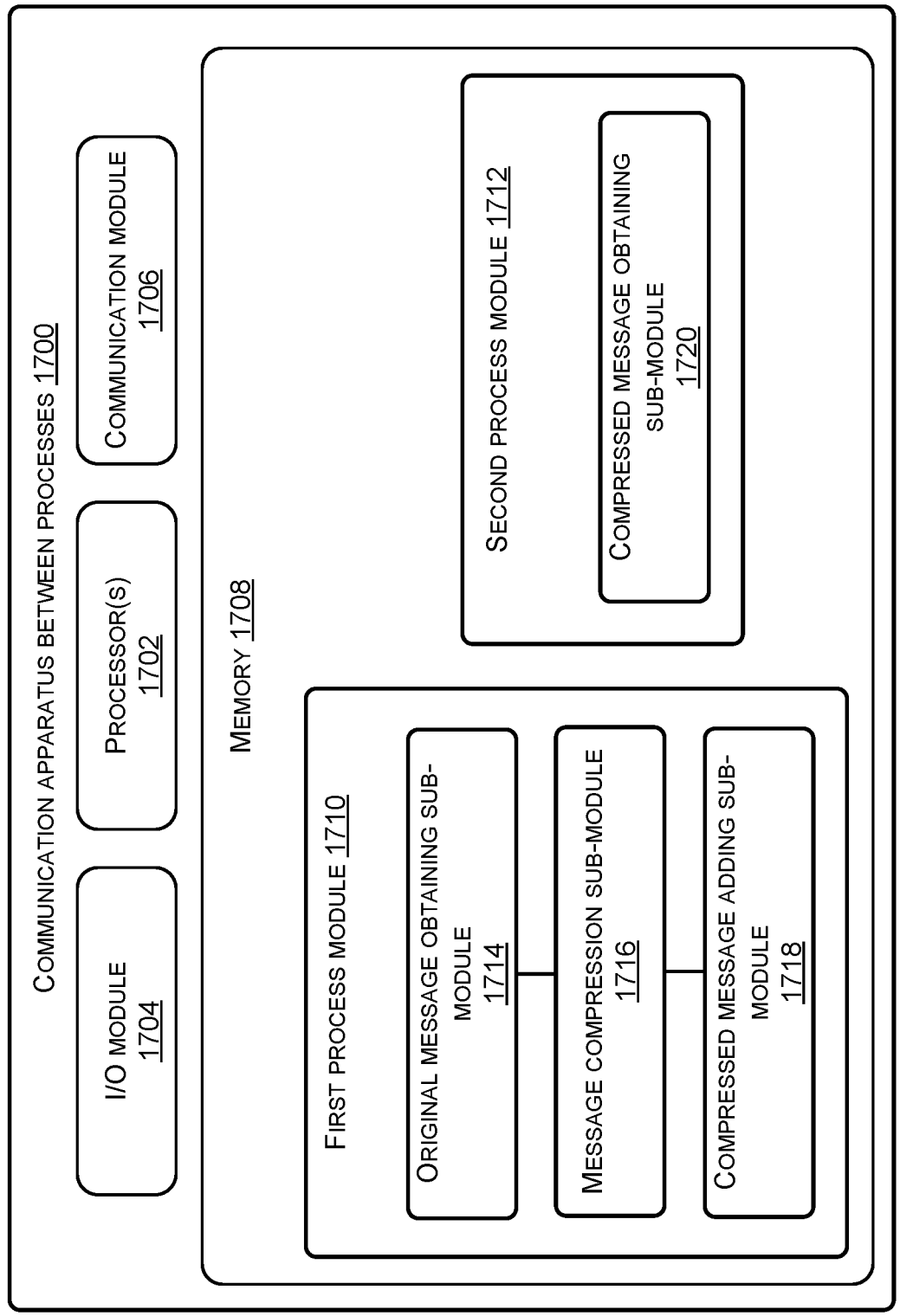
FIG. 17 is a structural block diagram of Embodiment 3 of an apparatus for communication between processes in the present disclosure.

Referring to FIG. 17, a structural block diagram of Embodiment 3 of an apparatus 1700 for communication between processes in the present disclosure is shown. The apparatus 1700 may include one or more processors 1702, an input/output module 1704, a communication module 1706, and a memory 1708. The input/output module 1704 is configured to receive data/signal to be processed and to output the processed data/signal. The communication module 1706 is configured to allow the apparatus 1700 to communicate with other devices (not shown) over a network (not shown). The memory 1708 stores thereon computer-executable modules executable by the one or more processors 1702. The computer-executable modules may include a first process module 1710 and a second process module 1712.

The first process module 1710 may include:

An original message obtaining sub-module 1714 is configured to obtain an original message to be sent, where the original message includes a message header and a message body.

A message compression sub-module 1716 is configured to compress the length of the message header according to the length of the message header and the length of the message body to obtain the compressed message.

In an example embodiment of the present disclosure, the length is a byte length.

A compressed message adding sub-module 1718 is configured to add the compressed message to the message queue pre-created for the second process.

The second process module 1712 may include:

A compressed message obtaining sub-module 1720 is configured to obtain the compressed message from the message queue.

In an example embodiment of the present disclosure, the message compression sub-module 1716 may include:

A target bit number determining unit is configured to determine a target bit number, where the target bit number is the number of bits of a target bit sequence, and the target bit sequence is the shortest bit sequence indicating the length of the message body.

A target length determining unit is configured to determine a target length according to the target bit number.

A message compression unit is configured to compress the length of the message header to the target length.

In an example embodiment of the present disclosure, the message compression unit may include:

A length setting subunit is configured to set the length of the message header to the target length.

A bit setting subunit is configured to set the values of the specific bits of the message header according to the target length, and use the remaining bits excluding the specific bits of the message header to indicate the length of the message body.

In an example embodiment of the present disclosure, in an example embodiment of the present disclosure, the length of the message header is 4. The target length determining unit may include:

A first target length determining subunit is configured to set the target length to 1 if the target bit number is less than or equal to 7.

A second target length determining subunit is configured to set the target length to 2 if the target bit number is greater than 7 and less than or equal to 14.

A third target length determining subunit is configured to set the target length to 3 if the target bit number is greater than 14 and less than or equal to 21.

A fourth target length determining subunit is configured to set the target length to 4 if the target bit number is greater than 21 and less than or equal to 29.

In an example embodiment of the present disclosure, the bit setting subunit may include:

A first bit setting component is configured to, if the target length is 1, set the first bit of the message header to 0, and use the last 7 bits of the message header to indicate the length of the message body.

A second bit setting component is configured to, if the target length is 2, set the first bit of the first byte of the message header to 1, and the second bit to 0, and use the values of the last 6 bits of the first byte and all bits of the second byte to indicate the length of the message body.

A third bit setting component is configured to, if the target length is 3, set the first bit of the first byte of the message header to 1, the second bit to 1, and the third bit to 0, and use the values of the last 5 bits of the first byte, and all bits of the second byte and the third byte to indicate the length of the message body.

A fourth bit setting component is configured to, if the target length is 4, set the first bit of the first byte of the message header to 1, the second bit to 1, and the third bit to 1, and use the values of the last 5 bits of the first byte, and all bits of the second byte, the third byte, and the fourth byte to indicate the length of the message body.

Figure 18:
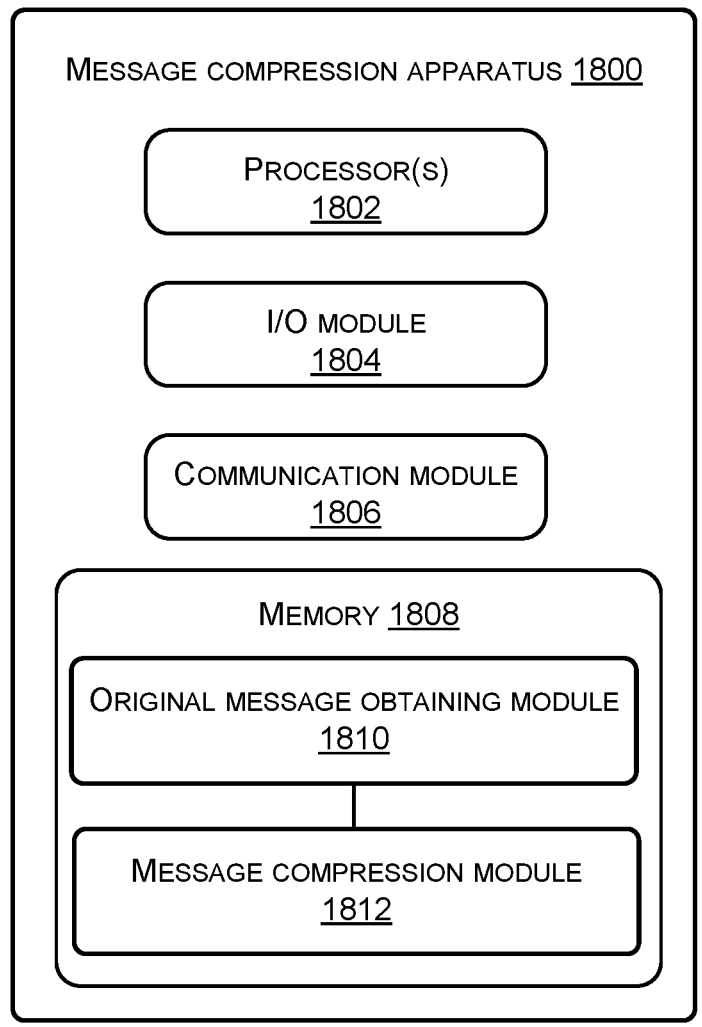
FIG. 18 is a structural block diagram of an example embodiment of a message compression apparatus of the present disclosure.

Referring to FIG. 18, a structural block diagram of an example embodiment of a message compression apparatus 1800 of the present disclosure is shown. The apparatus 1800 may include one or more processors 1802, an input/output module 1804, a communication module 1806, and a memory 1808. The input/output module 1804 is configured to receive data/signal to be processed and to output the processed data/signal. The communication module 1806 is configured to allow the apparatus 1800 to communicate with other devices (not shown) over a network (not shown). The memory 1808 stores thereon computer-executable modules executable by the one or more processors 1802. The computer-executable modules may include the following:

An original message obtaining module 1810 is configured to obtain an original message, where the original message includes a message header and a message body.

A message compression module 1812 is configured to compress the length of the message header according to the length of the message header and the length of the message body to obtain the compressed message.

In an example embodiment of the present disclosure, the message compression module 1812 may include:

A target bit number determining sub-module for determining a target bit number, where the target bit number is the number of bits of a target bit sequence, and the target bit sequence is the shortest bit sequence indicating the length of the message body.

A target length determining sub-module is configured to determine a target length according to the target bit number.

A message compression sub-module is configured to compress the length of the message header to the target length.

In an example embodiment of the present disclosure, the message compression sub-module may include:

A length setting unit is configured to set the length of the message header to the target length.

A bit setting unit is configured to set the values of the specific bits of the message header according to the target length, and use the remaining bits excluding the specific bits of the message header to indicate the length of the message body.

In an example embodiment of the present disclosure, the length of the message header is 4. The target length determining sub-module may include:

A first target length determining unit is configured to set a target length to 1 if the target bit number is less than or equal to 7.

A second target length determining unit is configured to set the target length to 2 if the target bit number is greater than 7 and less than or equal to 14.

A third target length determining unit is configured to set the target length to 3 if the target bit number is greater than 14 and less than or equal to 21.

A fourth target length determining unit is configured to set the target length to 4 if the target bit number is greater than 21 and less than or equal to 29.

In an example embodiment of the present disclosure, the bit setting unit may include:

A first bit setting subunit is configured to, if the target length is 1, set the first bit of the message header to 0, and use the last 7 bits of the message header to indicate the length of the message body.

A second bit setting subunit is configured to, if the target length is 2, set the first bit of the first byte of the message header to 1, and the second bit to 0, and use the values of the last 6 bits of the first byte and all bits of the second byte to indicate the length of the message body.

A third bit setting subunit is configured to, if the target length is 3, set the first bit of the first byte of the message header to 1, the second bit to 1, and the third bit to 0, and use the values of the last 5 bits of the first byte, and all bits of the second byte and the third byte to indicate the length of the message body.

A fourth bit setting subunit is configured to, if the target length is 4, set the first bit of the first byte of the message header to 1, the second bit to 1, and the third bit to 1, and use the values of the last 5 bits of the first byte, and all bits of the second byte, the third byte, and the fourth byte to indicate the length of the message body.

Figure 19:
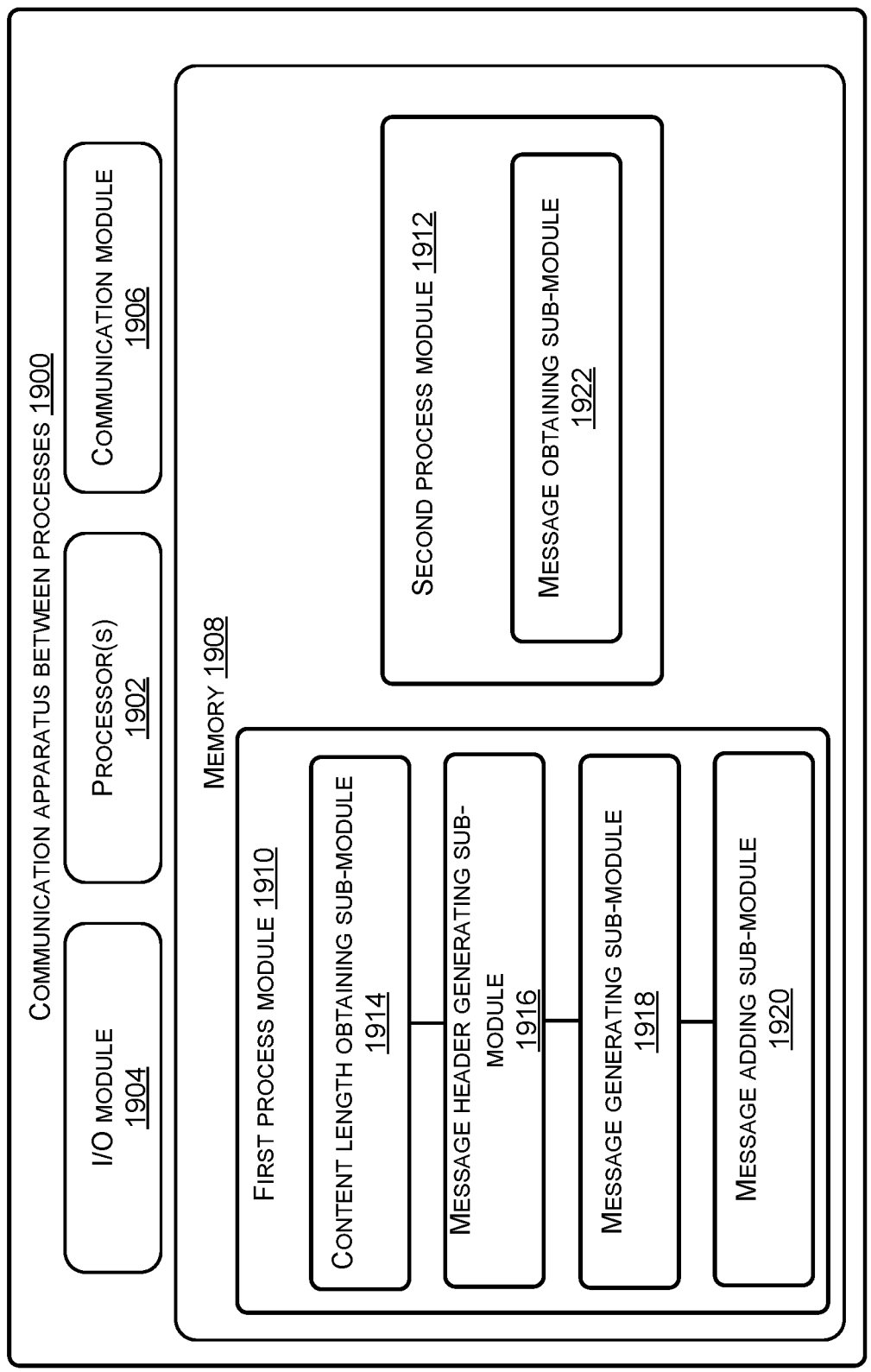
FIG. 19 is a structural block diagram of Embodiment 3 of an apparatus for communication between processes in the present disclosure.

Referring to FIG. 19, a structural block diagram of Embodiment 3 of an apparatus 1900 for communication between processes of the present disclosure is shown. The apparatus 1900 may include one or more processors 1902, an input/output module 1904, a communication module 1906, and a memory 1908. The input/output module 1904 is configured to receive data/signal to be processed and to output the processed data/signal. The communication module 1906 is configured to allow the apparatus 1900 to communicate with other devices (not shown) over a network (not shown). The memory 1908 stores thereon computer-executable modules executable by the one or more processors 1902. The computer-executable modules may include a first process module 1910 and a second process module 1912.

The first process module 1910 may include:

A content length obtaining sub-module 1914 is configured to obtain the length of a message content to be sent.

In an example embodiment of the present disclosure, the length is a byte length.

A message header generating sub-module 1916 is configured to generate a corresponding message header according to the length of the message content.

A message generating sub-module 1918 is configured to generate a message to be sent according to the message header and the message content.

A message adding sub-module 1920 is configured to add the message to be sent to the message queue pre-created for the second process.

The second process module 1912 may include:

A message obtaining sub-module 1922 is configured to obtain the message from the message queue.

In an example embodiment of the present disclosure, the message header generating sub-module 1916 may include:

A message header length determining unit is configured to determine the length of the message header according to the length of the message content.

A message header generating unit is configured to generate a message header according to the length of the message header.

A bit setting unit is configured to set the values of the specific bits of the message header according to the target length, and use the remaining bits excluding the specific bits of the message header to indicate the length of the message content.

In an example embodiment of the present disclosure, the bit setting unit may include:

A first bit setting subunit is configured to, if the target length is 1, set the first bit of the message header to 0, and use the last 7 bits of the message header to indicate the length of the message body.

A second bit setting subunit is configured to, if the target length is 2, set the first bit of the first byte of the message header to 1, and the second bit to 0, and use the values of the last 6 bits of the first byte and all bits of the second byte to indicate the length of the message body.

A third bit setting subunit is configured to, if the target length is 3, set the first bit of the first byte of the message header to 1, the second bit to 1, and the third bit to 0; and use the values of the last 5 bits of the first byte, and all bits of the second byte and the third byte to indicate the length of the message body.

A fourth bit setting subunit is configured to, if the target length is 4, set the first bit of the first byte of the message header to 1, the second bit to 1, and the third bit to 1, and use the values of the last 5 bits of the first byte, and all bits of the second byte, the third byte, and the fourth byte to indicate the length of the message body.

In an example embodiment of the present disclosure, the message header length determining unit may include:

A bit number determining subunit is configured to determine a target bit number according to the length of the message content, where the target bit number is the number of bits of a target bit sequence, and the target bit sequence is the shortest bit sequence indicating the length of the message content.

A target length determining subunit is configured to determine a target length according to the target bit number.

In an example embodiment of the present disclosure, the length of the message header is 4. The target length determining sub-module may include:

A first target length determining unit is configured to set a target length to 1 if the target bit number is less than or equal to 7.

A second target length determining unit is configured to set the target length to 2 if the target bit number is greater than 7 and less than or equal to 14.

A third target length determining unit is configured to set the target length to 3 if the target bit number is greater than 14 and less than or equal to 21.

A fourth target length determining unit is configured to set the target length to 4 if the target bit number is greater than 21 and less than or equal to 29.

Figure 20:
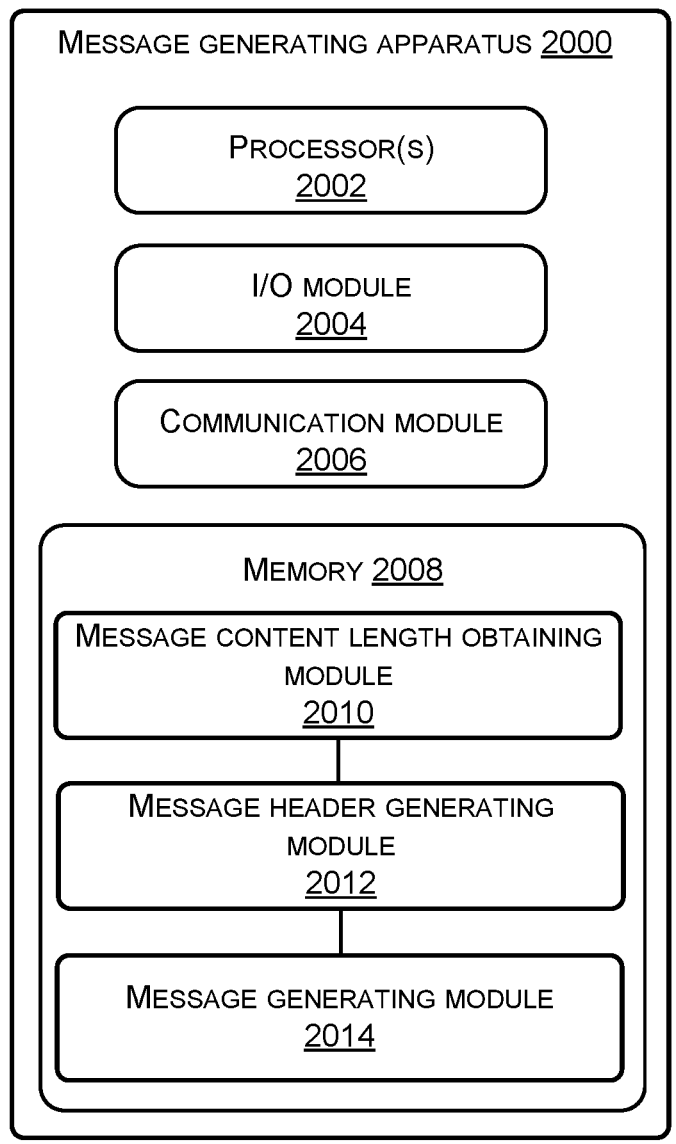
FIG. 20 is a structural block diagram of an example embodiment of a message generating apparatus of the present disclosure.

Referring to FIG. 20, a structural block diagram of an example embodiment of a message generating apparatus 2000 of the present disclosure is shown. The apparatus 2000 may include one or more processors 2002, an input/output module 2004, a communication module 2006, and a memory 2008. The input/output module 2004 is configured to receive data/signal to be processed and to output the processed data/signal. The communication module 2006 is configured to allow the apparatus 2000 to communicate with other devices (not shown) over a network (not shown). The memory 2008 stores thereon computer-executable modules executable by the one or more processors 2002. The computer-executable modules may include the following:

A message content length obtaining module 2010 is configured to obtain the length of the message content.

In an example embodiment of the present disclosure, the length is a byte length.

A message header generating module 2012 is configured to generate a corresponding message header according to the length of the message content.

A message generating module 2014 is configured to generate a message according to the message header and the message content.

In an example embodiment of the present disclosure, the message header generating module 2012 may include:

A message header length determining sub-module is configured to determine the length of the message header according to the length of the message content.

A message header generating sub-module is configured to generate a message header according to the length of the message header.

A bit setting sub-module is configured to set the values of the specific bits of the message header according to the length of the message header, and use the remaining bits excluding the specific bits of the message header to indicate the length of the message content.

In an example embodiment of the present disclosure, the bit setting sub-module may include:

A first bit setting unit is configured to, if the target length is 2, set the first bit of the first byte of the message header to 1, and the second bit to 0, and use the values of the last 6 bits of the first byte and all bits of the second byte to indicate the length of the message body.

A second bit setting unit is configured to, if the target length is 3, set the first bit of the first byte of the message header to 1, the second bit to 1, and the third bit to 0, and use the values of the last 5 bits of the first byte, and all bits of the second byte and the third byte to indicate the length of the message body.

A third bit setting unit is configured to, if the target length is 3, set the first bit of the first byte of the message header to 1, the second bit to 1, and the third bit to 0, and use the values of the last 5 bits of the first byte, and all bits of the second byte and the third byte to indicate the length of the message body.

A fourth bit setting unit is configured to, if the target length is 4, set the first bit of the first byte of the message header to 1, the second bit to 1, and the third bit to 1, and use the values of the last 5 bits of the first byte, and all bits of the second byte, the third byte, and the fourth byte to indicate the length of the message body.

In an example embodiment of the present disclosure, the message header length determining sub-module may include:

A target bit number determining unit is configured to determine a target bit number according to the length of the message content, where the target bit number is the number of bits of a target bit sequence, and the target bit sequence is the shortest bit sequence indicating the length of the message content.

A target length determining unit is configured to determine a target length according to the target bit number.

In an example embodiment of the present disclosure, the target length determining unit may include:

In an example embodiment of the present disclosure, the length of the message header is 4. The target length determining unit may include:

A first target length determining subunit is configured to set a target length to 1 if the target bit number is less than or equal to 7.

A second target length determining subunit is configured to set the target length to 2 if the target bit number is greater than 7 and less than or equal to 14.

A third target length determining subunit is configured to set the target length to 3 if the target bit number is greater than 14 and less than or equal to 21.

A fourth target length determining subunit is configured to set the target length to 4 if the target bit number is greater than 21 and less than or equal to 29.

For the apparatus embodiments, since they are similar to the method embodiments, the descriptions are relatively simple, and relevant parts may be referred to the descriptions of the method embodiments.

Figure 21:
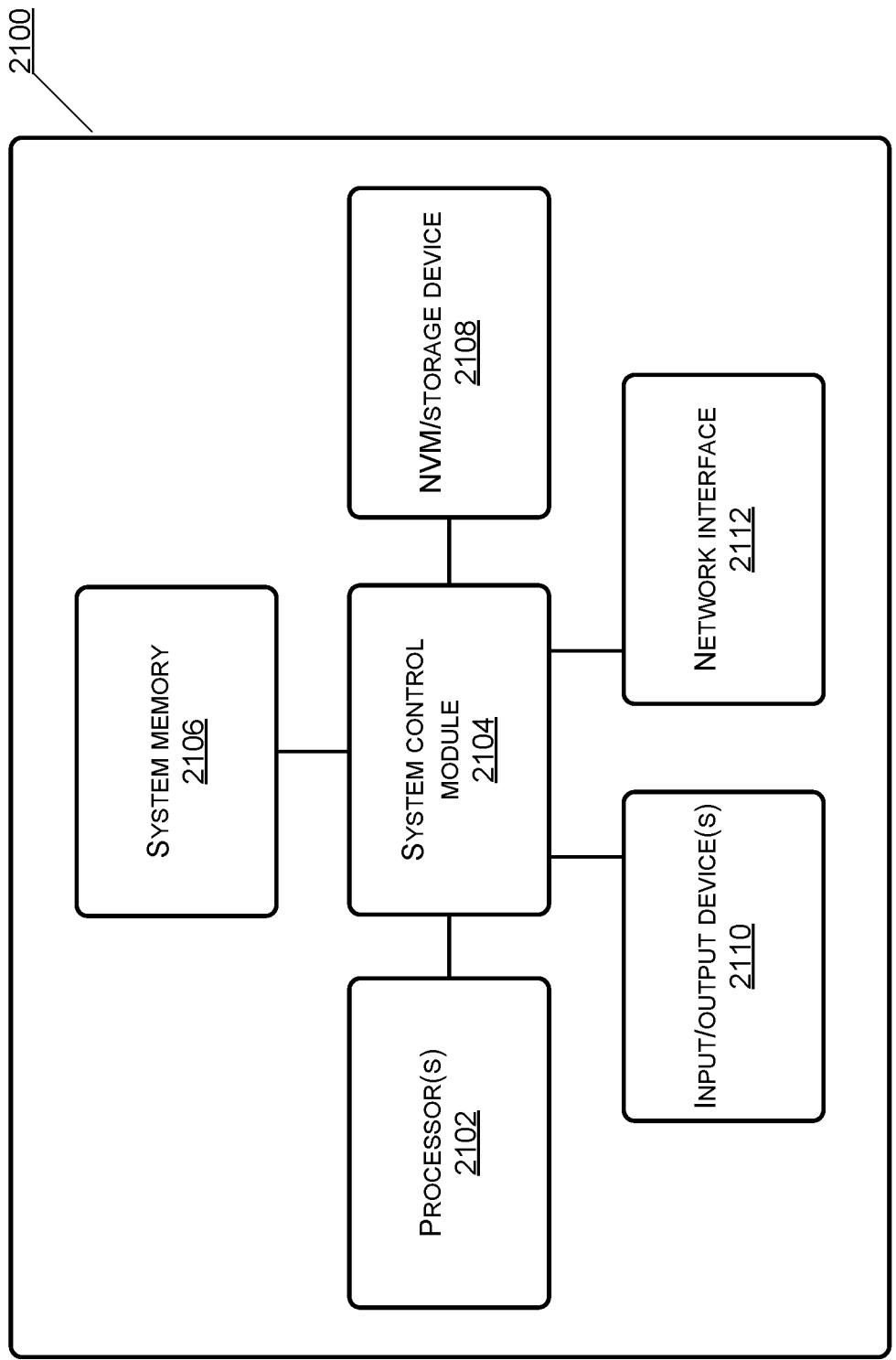
FIG. 21 is a structural block diagram of an example embodiment of a smart terminal according to the present disclosure.

Embodiments of the present disclosure may be implemented as a system for with a desired configuration using any suitable hardware, firmware, software, or any combination thereof. FIG. 21 schematically illustrates an exemplary system (or apparatus) 2100 that may be used to implement various embodiments described in this disclosure.

For an example embodiment, FIG. 21 illustrates an exemplary system 2100, which includes one or more processors 2102, a system control module (a chipset) 2104 coupled to at least one of the one or more processors 2102, system memory 2106 coupled to system control module 2104, non-volatile memory (NVM)/storage device 2108 coupled to system control module 2104, one or more input/output devices 2110 coupled to system control module 2104, and network interface 2112 coupled to system control module 2106.

The processor 2102 may include one or more single or multi-core processors. The processor 2102 may include any combination of general purpose or special purpose processors (for example, graphics processors, application processors, baseband processors, etc.). In example embodiments, system 2100 can work as a browser as described in embodiments of the present disclosure.

In example embodiments, the system 2100 may include one or more computer-readable media (for example, system memory 2106 or NVM/storage device 2108) having instructions, and one or more processors 2102 that are coupled with the one or more computer-readable media and are configured to execute the instructions to implement the modules to perform the actions described in this disclosure.

For an example embodiment, the system control module 2104 may include any suitable interface controller to provide a suitable interface to at least one of the one or more processors 2102 and/or any suitable device or component in communication with the system control module 2104.

The system control module 2104 may include a memory controller module to provide an interface to the system memory 2106. The memory controller module may be a hardware module, a software module, and/or a firmware module.

The system memory 2106 may be used, for example, to load and store data and/or instructions for the system 2100. For an example embodiment, system memory 2106 may include any suitable volatile memory, such as a suitable DRAM. In example embodiments, system memory 2106 may include double data rate type 4 synchronous dynamic random access memory (DDR4 SDRAM).

For an example embodiment, system control module 2104 may include one or more input/output controllers to provide an interface to NVM/storage device 2108 and one or more input/output devices 2110.

For example, NVM/storage device 2108 may be used to store data and/or instructions. NVM/storage device 2108 may include any suitable non-volatile memory (for example, flash memory) and/or any suitable one or more non-volatile storage devices (for example, one or more hard disk drives (HDD), one or more compact disc (CD) drives, and/or one or more digital versatile disc (DVD) drives).

NVM/storage device 2108 may include a storage resource that is physically part of a device on which system 2100 is installed, or may be accessed by the device without being part of the device. For example, the NVM/storage device 2108 may be accessed via the network via the one or more input/output devices 2110.

The one or more input/output devices 2110 can provide an interface to the system 2100 to communicate with any other suitable device. The input/output device 2110 may include a communication component, an audio component, a sensor component, and the like. The network interface 2112 can provide an interface for the system 2100 to communicate over one or more networks. The system 2100 can communicate wirelessly with one or more components of the wireless network in accordance with any standard and/or protocol of one or more wireless network standards and/or protocols, for example, accessing the wireless network based on a communication standard, such as WiFi, 2G or 3G, or a combination thereof, for wireless communication.

For an example embodiment, at least one of the one or more processors 2102 may be packaged with the logic of one or more controllers (for example, memory controller modules) of the system control module 2104. For an example embodiment, at least one of the one or more processors 2102 may be packaged with the logic of one or more controllers of the system control module 2104 to form a system in package (SiP). For an example embodiment, at least one of the one or more processors 2102 may be integrated on the same mold with the logic of one or more controllers of the system control module 2104. For an example embodiment, at least one of the one or more processors 2102 may be integrated on the same mold with the logic of one or more controllers of the system control module 2104 to form a system on a chip (SoC).

In various embodiments, system 2100 may be, but is not limited to, a browser, a workstation, a desktop computing device, or a mobile computing device (for example, a laptop computing device, a handheld computing device, a tablet, a netbook, etc.). In various embodiments, system 2100 can have more or fewer components and/or different architectures. For example, in some embodiments, system 2100 includes one or more cameras, a keyboard, a liquid crystal display (LCD) screen (including a touch screen display), a non-volatile memory port, multiple antennas, a graphics chip, an application specific integrated circuit (ASIC), and speakers.

If the display includes a touch panel, the display screen may be implemented as a touch screen display to receive an input signal from a user. The touch panel includes one or more touch sensors to sense touches, slides, and gestures on the touch panel. The touch sensors may sense not only the boundary of the touch or sliding action, but also the duration and pressure associated with the touch or slide operation.

The embodiment of the present disclosure further provides a non-volatile readable storage medium, where the storage medium stores one or more modules (programs). When the one or more modules are applied to the terminal device, the terminal device is caused to execute the instructions of the respective method steps in the example embodiments of the present disclosure.

In one example, an apparatus is provided, including one or more processors, and one or more machine-readable media having instructions stored thereon that, when executed by one or more processors, cause the apparatus to perform the methods in the example embodiments of the present disclosure.

In one example, one or more machine-readable medium is also provided, storing instructions thereon that, when executed by one or more processors, cause the apparatus to perform the methods in the example embodiments of the present disclosure.

The various embodiments in the present disclosure are described in a progressive manner. The respective embodiments focus on differences from other embodiments. The same or similar parts between the various embodiments may be referred to each other.

Those skilled in the art should understand that embodiments of the present disclosure may be provided as methods, apparatus, or computer program products. Therefore, the example embodiments of the present disclosure may take the form of an entirely hardware embodiment, an entirely software embodiment, or an embodiment combining software and hardware. Moreover, embodiments of the present disclosure can take the form of a computer program product embodied on one or more computer-usable storage media (including but not limited to disk storage, CD-ROM, optical storage, etc.) containing computer usable program codes.

The example embodiments of the present disclosure are described with reference to flowcharts and/or block diagrams of methods, terminal devices (systems), and computer program products according to embodiments of the present disclosure. It should be understood that each flow and/or block of the flowcharts and/or block diagrams and a combination of flows and/or blocks of the flowcharts and/or block diagrams may be implemented by computer program instructions. These computer program instructions may be provided to a processor of a general purpose computer, special purpose computer, embedded processor, or other programmable data processing terminal devices to produce a machine such that instructions are executed by the processor of the computer or other programmable data processing terminal devices to produce means for implementing the functions specified in one or more flows in the flow chart and/or one or more blocks in the block diagram.

These computer program instructions may also be stored in a computer-readable memory that can direct a computer or other programmable data processing terminal devices to operate in a particular manner such that the instructions stored in the computer-readable memory produce a manufacture that includes instruction means. The instruction means implements the functions specified in one or more flows in the flow chart and/or one or more blocks in the block diagram.

These computer program instructions can also be loaded onto a computer or other programmable data processing terminal devices such that a series of operational steps are performed on the computer or other programmable terminal devices to produce computer-implemented processing, such that the instructions executed on the computer or other programmable terminal devices provide steps for implementing the functions specified in one or more flows in the flow chart and/or one or more blocks in the block diagram.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Though example embodiments of the present disclosure have been described, those skilled in the art can make further changes and modifications to the embodiments once they are aware of the present disclosure. Therefore, the appended claims are intended to be interpreted as including all the changes and the modifications.

Finally, it should also be noted that, in this context, relational terms such as first and second, etc. are used merely to distinguish one entity or operation from another entity or operation, without necessarily requiring or implying that there is any such actual relationship or order between these entities or operations. Furthermore, the terms "comprises", "comprising" or any other variations are intended to encompass a non-exclusive inclusion, such that processes, methods, articles, or terminal devices that include a plurality of elements includes not only those elements but also other elements that are not explicitly listed, or elements inherent to such processes, methods, articles, or terminal devices. Without further limitation, an element defined by the phrase "comprising a . . . " does not exclude the presence of additional identical elements in the processes, methods, articles, or terminal devices that include the element.

The communication method between processes and the communication apparatus between processes provided by the present disclosure are described in detail as above. The principles and embodiments of the present disclosure are described with the specific examples. The above descriptions of the embodiments are only for helping to understand the method of the present disclosure. At the same time, for those of ordinary skill in the art, according to the idea of the present disclosure, there may be changes in specific embodiments and application scopes. In summary, the content of the specification should not be construed as limiting the present disclosure.

What is claimed is:

1. A method, comprising:
obtaining, by a first process, an original message to be sent, the original message including a message header and a message body;
determining, by the first process, a length of the message header and a length of the message body of the original message to be sent;
compressing, by the first process, the length of the message header according to the length of the message header and the length of the message body to obtain a compressed message, wherein compressing, by the first process, the length of the message header to the target length includes:
setting, by the first process, the length of the message header to a target length; and
setting, by the first process, one or more values of one or more specific bits of the message header according to the target length, and using remaining bits excluding the one or more specific bits of the message header to indicate the length of the message body; and adding, by the first process, the compressed message to a message queue pre-created for a second process, wherein the second process is configured to obtain the compressed message from the message queue.

2. The method of claim 1, wherein compressing, by the first process, the length of the message header according to the length of the message header and the length of the message body to obtain the compressed message further includes:

determining, by the first process, a target bit number, wherein the target bit number is a number of bits of a target bit sequence, and the target bit sequence is a shortest bit sequence indicating the length of the message body;

determining, by the first process, the target length according to the target bit number; and compressing, by the first process, the length of the message header to the target length.

3. The method of claim 2, wherein the length of the message header is 4, and determining, by the first process, the target length according to the target bit number includes:

setting the target length to 1 if the target bit number is less than or equal to 7;

setting the target length to 2 if the target bit number is greater than 7 and less than or equal to 14;

setting the target length to 3 if the target bit number is greater than 14 and less than or equal to 21; and setting the target length to 4 if the target bit number is greater than 21 and less than or equal to 29.

4. The method of claim 3, wherein setting, by the first process, the one or more values of the one or more specific bits of the message header according to the target length, and using the remaining bits excluding the one or more specific bits of the message header to indicate the length of the message body includes:

setting a first bit of the message header to 0, and using last 7 bits of the message header to indicate the length of the message body, if the target length is 1;

setting a first bit of a first byte of the message header to 1 and setting a second bit of the first byte to 0, and using values of last 6 bits of the first byte and all bits of a second byte to indicate the length of the message body, if the target length is 2;

setting the first bit of the first byte of the message header to 1, setting the second bit of the first byte to 1, and setting a third bit of the first byte to 0, and using values of last 5 bits of the first byte and all bits of the second byte and the third byte to indicate the length of the message body, if the target length is 3; and setting the first bit of the first byte of the message header to 1, setting the second bit of the first byte to 1, and setting the third bit of the first byte to 1, and using values of the last 5 bits of the first byte and all bits of the second byte, the third byte, and a fourth byte to indicate the length of the message body, if the target length is 4.

5. The method of claim 1, wherein the length of the message header is a byte length of the message header, and the length of the message body is a byte length of the message body.

6. A computer-readable medium storing computer-readable instructions executable by one or more processors, that when executed by the one or more processors, causes the one or more processors to perform acts comprising:

determining, by a second process, a length of a message header of a compressed message, wherein the compressed message includes a message header and a message body, wherein determining, by the second process, the length of the message header of the compressed message includes:

reading, by the second process, one or more values of one or more bits one by one from the message queue until the one or more values of the read bits satisfy a preset condition; and determining, by the second process, the length of the message header of the compressed message according to the one or more values of the read bits, when the one or more values of the read bits satisfy the preset condition;

reading, by the second process, the message header of the compressed message from a message queue pre-created by a first process for the second process, according to the length of the message header of the compressed message;

determining, by the second process, the length of the message body according to the message header of the compressed message; and reading, by the second process, a content with a corresponding length from the message queue as the message body according to the length of the message body.

7. The computer-readable medium of claim 6, wherein reading, by the second process, the message header of the compressed message from the message queue pre-created by the first process for the second process according to the length of the message header of the compressed message includes:

reading, by the second process, one or more values of a first number of bits from the message queue according to the length of the message header of the compressed message, wherein the first number is a number of bits corresponding to the length of the message header subtracting a number of bits read when the preset condition is satisfied; and adding, by the second process, the one or more values of the first number of bits to one or more values of the bits read when the preset condition is satisfied as the message header of the compressed message.

8. The computer-readable medium of claim 6, wherein determining, by the second process, the length of the message body according to the message header of the compressed message includes:

determining, by the second process, the length of the message body according to one or more values of one or more specific bits of the message header of the compressed message.

9. The computer-readable medium of claim 8, wherein determining, by the second process, the length of the message header of the compressed message according to the one or more values of the read bits when the one or more values of the read bits satisfy the preset condition includes:

determining, by the second process, the length of the message header as 1, if a value of a first bit is 0;

determining, by the second process, the length of the message header as 2, if the value of the first bit is 1 and a value of a second bit is 0;

determining, by the second process, the length of the message header as 3, if the value of the first bit is 1, the value of the second bit is 1, and a value of a third bit is 0; and determining, by the second process, the length of the message header as 4, if the value of the first bit is 1, the value of the second bit is 1, and the value of the third bit is 1.

10. The computer-readable medium of claim 9, wherein determining, by the second process, the length of the message body according to the one or more values of the one or more specific bits of the message header of the compressed message includes:
   determining, by the second process, the length of the message body using values of last 7 bits of the message header, if the length of the message header is 1;
   determining, by the second process, the length of the message body using values of last 6 bits of a first byte of the message header and values of all bits of a second byte, if the length of the message header is 2;
   determining, by the second process, the length of the message body using values of last 5 bits of the first byte of the message header and values of all bits of the second byte and a third byte of the message header, if the length of the message header is 3; and
   determining, by the second process, the length of the message body using the values of the last 5 bits of the first byte of the message header and values of all bits of the second byte, the third byte, and a fourth byte of the message header, if the length of the message header is 4.

11. The computer-readable medium of claim 6, wherein the length of the message header is a byte length of the message header, and the length of the message body is a byte length of the message body.

12. An apparatus, comprising:
   one or more processors,
   memory, coupled to the one or more processors, the memory storing thereon computer-executable modules, executable by the one or more processors, the executable modules including:
   a first process module and a second process module;
   wherein the first process module includes:
      an original message obtaining sub-module, configured to obtain an original message to be sent, wherein the original message including a message header and a message body;
      a length determining sub-module, configured to determine a length of the message header and a length of the message body of the original message to be sent;
      a message compression sub-module, configured to compress the length of the message header according to the length of the message header and the length of the message body to obtain a compressed message; and
      a compressed message adding sub-module, configured to add the compressed message to a message queue pre-created for the second process module, wherein the message compression sub-module includes:
         a target bit number determining unit, configured to determine a target bit number, wherein the target bit number is a number of bits of a target bit sequence, and the target bit sequence is a shortest bit sequence indicating the length of the message body; and
         a target length determining unit, configured to determine a target length according to the target bit number; and
         a message compression unit, configured to compress the length of the message header to the target length; and wherein the second process module includes:
   a compressed message obtaining sub-module, configured to obtain the compressed message from the message queue.

13. The apparatus of claim 12, wherein the message compression unit includes:
   a length setting subunit, configured to set the length of the message header to the target length; and
   a bit setting subunit, configured to set one or more values value of one or more specific bits of the message header according to the target length, and using remaining bits excluding the one or more specific bits of the message header to indicate the length of the message body.

14. The apparatus of claim 13, wherein the length of the message header is 4, and the target length determining unit includes:
   a first target length determining subunit, configured to set the target length to 1 if the target bit number is less than or equal to 7;
   a second target length determining subunit, configured to set the target length to 2 if the target bit number is greater than 7 and less than or equal to 14;
   a third target length determining subunit, configured to set the target length to 3 if the target bit number is greater than 14 and less than or equal to 21; and
   a fourth target length determining subunit, configured to set the target length to 4 if the target bit number is greater than 21 and less than or equal to 29.

15. The apparatus of claim 14, wherein the bit setting subunit includes:
   a first bit setting component, configured to set a first bit of the message header to 0, and use last 7 bits of the message header to indicate the length of the message body, if the target length is 1;
   a second bit setting component, configured to set a first bit of a first byte of the message header to 1 and set a second bit of the first byte to 0, and use values of last 6 bits of the first byte and all bits of a second byte to indicate the length of the message body, if the target length is 2;
   a third bit setting component, configured to set the first bit of the first byte of the message header to 1, set the second bit of the first byte to 1, and set a third bit of the first byte to 0, and use values of last 5 bits of the first byte and all bits of the second byte and a third byte to indicate the length of the message body, if the target length is 3; and
   a fourth bit setting component, configured to set the first bit of the first byte of the message header to 1, set the second bit of the first byte to 1, and set the third bit of the first byte to 1, and uses the values of the last 5 bits of the first byte and all bits of the second byte, the third byte, and a fourth byte to indicate the length of the message body, if the target length is 4.

16. The apparatus of claim 12, wherein the length of the message header is a byte length of the message header.

17. The apparatus of claim 12, wherein, the length of the message body is a byte length of the message body.

* * * * *